United States Patent [19]

Kitai et al.

[11] 4,038,675
[45] July 26, 1977

[54] SYSTEM FOR INDICATING THE OPERATION OF A SELF-TIMER IN AN ELECTRIC SHUTTER FOR CAMERA

[75] Inventors: Kiyoshi Kitai, Tokyo; Takeo Saito, Yotsukaido; Youichi Seki, Chiba, all of Japan

[73] Assignee: Seiko Koki Kabushiki Kaisha, Japan

[21] Appl. No.: 558,356

[22] Filed: Mar. 14, 1975

[30] Foreign Application Priority Data

Mar. 14, 1974 Japan .................. 49-28546

[51] Int. Cl.² ........................................... G03B 9/64
[52] U.S. Cl. ............................. 354/238; 354/23 D; 354/60 L
[58] Field of Search ............... 354/23 D, 50, 51, 60 R, 354/60 A, 238, 60 L

[56] References Cited

U.S. PATENT DOCUMENTS

| | | | |
|---|---|---|---|
| 3,595,154 | 7/1971 | Espig | 354/238 |
| 3,824,608 | 7/1974 | Toyodu | 354/23 D |
| 3,842,587 | 10/1974 | Strauss et al. | 354/23 D |
| 3,868,704 | 2/1975 | Yamada et al. | 354/23 D |

FOREIGN PATENT DOCUMENTS 2,328,422  1/1974  Germany .................. 354/23 D

OTHER PUBLICATIONS

*TTL Cook Book*, Don Lancaster, 1974, p. 208.
*Designing with TTL Integrated Circuits*, prepared by Texas Instruments Inc., 1971, p. 256.

*Primary Examiner*—Russell E. Adams
*Attorney, Agent, or Firm*—Robert E. Burns; Emmanuel J. Lobato; Bruce L. Adams

[57] ABSTRACT

An electric camera shutter of the type having a digital recording and reproducing system has a self-timer mode and has a counter circuit for counting and memorizing pulses produced by a pulse generator. In one mode of operation, the exposure time is controlled in accordance with the memorized content of the counter circuit and when in the self-timer mode, the output of the counter circuit controls the energization of a self-timer operation indicator circuit which indicates operation in the self-timer mode.

3 Claims, 16 Drawing Figures

SYSTEM FOR INDICATING THE OPERATION OF A SELF-TIMER IN AN ELECTRIC SHUTTER FOR CAMERA

BACKGROUND OF THE INVENTION

This invention relates to a system for indicating the operating state of a self-timer in an electric shutter camera exposure time control system using a digital recording and reproducing system for counting and memorizing a number of pulses produced from a pulse generator circuit in a counter circuit, said number corresponding to the brightness of a subject, and controlling the exposure time in response to the triggering of a camera shutter according to the memorized content of said counter.

Cameras provided with an electric self-timer system usually call for an indicator circuit for indicating the operation of the self-timer or the end of the self-timer operation because of the quiet operation of the self-timer of absence of a driven member driven in the operation of the self-timer such as a self-timer lever in a mechanical self-timer.

In the heretofore proposed systems for indicating the operation of an outside light detection type electric shutter, a delay circuit consisting of a capacitor and a resistor is provided separately of an exposure time control circuit so that it may be operated at the time of using the self-timer. Also, a self-timer operation indicator lamp is provided in parallel with a self-timer period control electromagnet, so that is turned on when the electromagnet is energized. Further, at the end of the self-timer period the indicator lamp is turned off while de-energizing the self-timer period control electromagnet, thereby indicating the end of the self-timer period. Thereafter, a mechanical select switch is switched from the self-timer delay circuit to an exposure time control circuit while opening the shutter blades in a well-known method for the exposure. In another proposed system, a self-timer operation indicator circuit is connected in parallel with a self-timing delay circuit for indicating the self-timer operation by burning or on-off operating an indicator lamp during the operative period of the self-timer delay circuit. Then, at the end of the operative period of the self-timer a select switch is mechanically switched in response to the de-energization of a self-timer control electromagnet from the self-timer delay circuit including the self-timer operation indicator circuit over to an exposure time control circuit, while at the same time the shutter blades are opened for exposure.

For inside light detection type electric shutters, however, there has not heretofore been proposed an electric self-timer circuit either for the system where the exposure time is controlled in an analog manner or for the digital control system. Consequently, no associated indicator circuit has been proposed.

Ponderable systems for indicating the operation of an inside light detection type shutter self-timer may include one, which, like the afore-mentioned outside light detection type electric shutter self-timer operation indicator circuit, includes a self-timer delay circuit provided separately of an exposure time control circuit and operated at the time of using the self-timer. With such system, it may also be thought to provide a self-timer operation indicator lamp in parallel with a self-timer period control electromagnet and which is lighted upon energization of the electromagnet to thereby indicate the operation of the self-timer. Alternatively, an indicator lamp in a self-timer operation indicator circuit provided in parallel with a self-timer delay circuit may be lighted for indicating the self-timer operation. In these systems, however, a self-timer delay circuit has to be provided separately of the exposure time control circuit. Particularly, a capacitor of a large capacitance is required to realize the self-timer period which is usually around 10 seconds, and this is disadvantageous from the standpoints of space factor and cost. Also, problems will be encountered in the reliability since use has to be made of mechanical select switches. Further, a decisive drawback of these systems is that it is difficult to obtain accurate memorizing operation in the inside light detection type electric shutter because the operation for indication is controlled by a signal from the self-timer control electromagnet. In other words, the time for memorizing the brightness of the subject is not available if it is so arranged as to turn off the indicator lamp and open the shutter blades in response to the de-energization of the selftimer control electromagnet at the end of the self-timer period. In case if it is so arranged as to effect the memorization within the self-timer period, the camera user cannot known when the memorization is effected since the electromagnet is energized during the self-timer period, with the indicator lamp being hence on during this period. Therefore, the indication of the self-timer operation in the proper sense, that is, indication or forecast of the end of the self-timer operation, cannot be obtained.

SUMMARY OF THE INVENTION

In the light of the foregoing, the present invention aims to provide an indicating system for indication of the operation of the self-timer of electric shutter cameras using a digital recording and reproducing system having a self-timer function for counting and memorizing a number of pulses produced from a pulse generator circuit in a counter circuit, said number corresponding to the brightness of the subject being photographed, controlling the exposure time in response to the triggering of a camera shutter according to the memorized content of said counter circuit, and controlling, in the case of using a self-timer, the operative period of the self-timer by frequency dividing the pulse output of said generator through said counter. The indicating system includes a self-timer operation indicator circuit controlled at the time of using the self-timer by the frequency division output of said counter.

An embodiment of the invention as described hereinafter is based on an electric shutter exposure time control system using a digital recording and reproducing system such as disclosed in U.S. patent applications, Ser. Nos. 499,982; and 499,977, and in which a self-timer circuit including a self-timer operation indicating circuit is incorporated.

DESCRIPTION OF PREFERRED EMBODIMENTS

Figure 1:
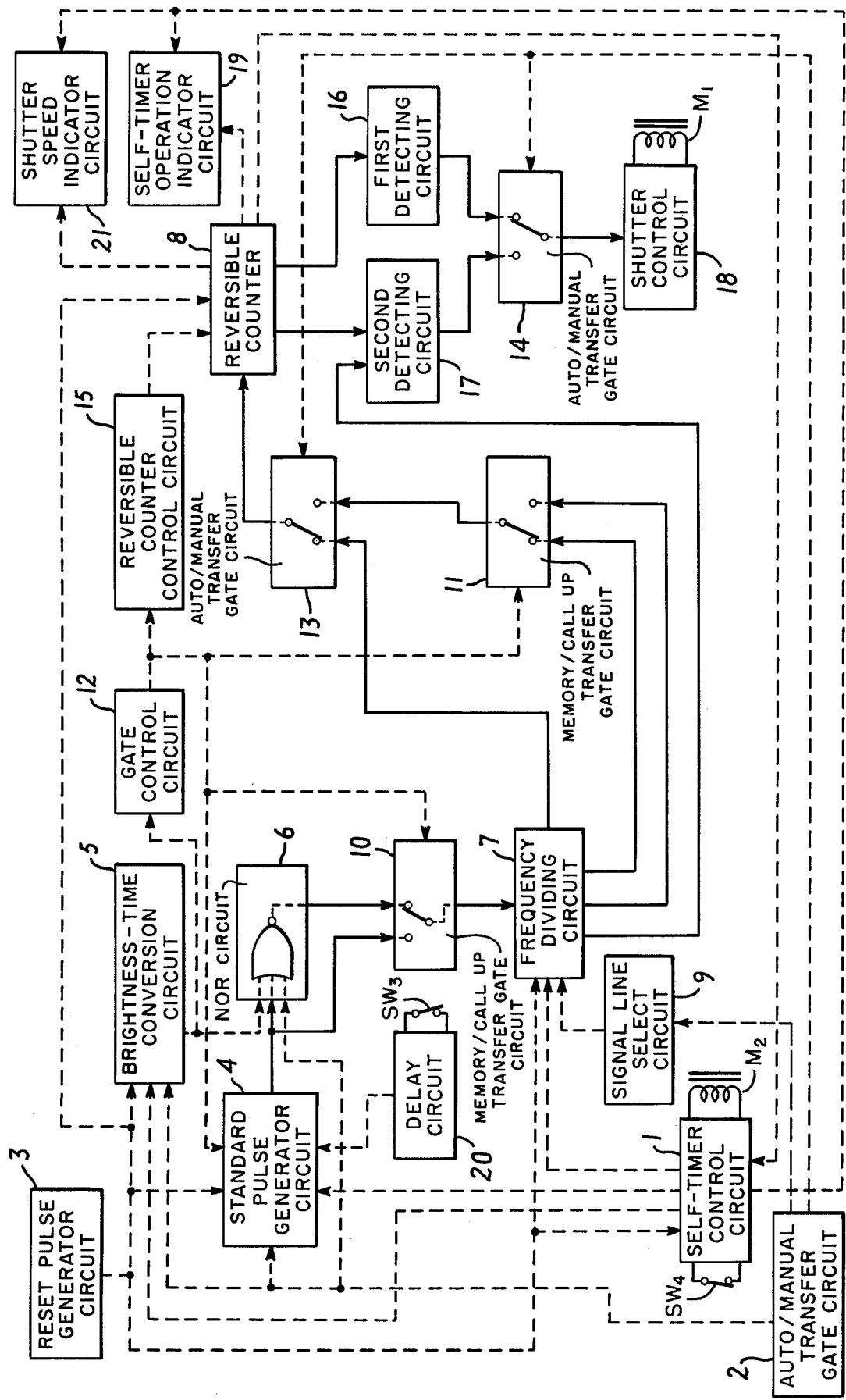
FIG. 1 is a block diagram outlining the overall construction of an indicating system according to the invention.

One embodiment of the invention will now be described with reference to the drawing. FIG. 1 is a block diagram outlining the construction of the embodiment and to simplify an understanding of the circuitry operation, the labeled blocks are interconnected by solid lines which represent signal paths for signals which determine the duration of the exposure time and by dashed lines which represent signal paths for control signals which control the operation of the circuit. Stated otherwise, the solid lines denote signal paths along which pass the standard pulses generated by the standard pulse generator circuit and the dashed lines denote signal paths along which pass the various control signals. Designated at 1 is a self-timer control circuit including a self-timer switch $SW_4$ closed only when a self-timer lever (not shown) is set at the time of using the self-timer and an electromagnet $M_2$ for controlling the self-timer period. An auto-manual transfer circuit 2 selects either automatic exposure time control or manual exposure time control. A reset pulse generator circuit 3 is provided for producing a reset pulse in synchronism to the closure of a power supply switch and standard pulse generator circuit for producing a standard pulse signal at a constant frequency. A brightness-time conversion circuit 5 is connected as shown an in the case of the automatic exposure time control, it produces a single pulse having a pulse length corresponding to the subject brightness determined through measurement of light permitted through the camera lens by means of a photo-conductive element such as CdS. In the case of the manual exposure time control, it produces a signal in synchronism to the closure of the power supply and independent of the subject brightness. (Hereinafter, the automatic exposure time control is referred to as automatic control and the manual exposure time control as manual control.) A NOR circuit 6 is provided which permits the standard pulse output of the standard pulse generator 4 during the presence of the single pulse output of the brightness-time conversion circuit 5 in the case of the automatic control. Designated at 7 is a frequency dividing circuit. In the case of the automatic control, an exposure time determining factor other than the brightness of the subject is led to it at the time of memorization, while at the time of the calling the standard pulse signal is coupled through a predetermined number of its stages for frequency division. In the case of the manual control, the standard pulse signal is coupled through all its stages before going to a reversible counter 8. The reversible counter 8 is a circuit which additively memorizes the number of input pulses when fed with an addition control signal from a reversible counter control circuit 15, while it effects progressive substraction from the pulse number memorized in it when fed with a subtraction control signal. Designated at 9 is a signal line select circuit having a plurality of control terminals. In the case of the automatic control, it is used for leading the exposure time determination factor other than the subject brightness. When a control terminal is selected according to the aforementioned factor, the standard pulse signal is led through a corresponding line connected to a gate between associated adjacent stages of the reversible counter 8 or through the frequency dividing circuit 7 to the reversible counter 8. In the case of the manual control, when a control terminal corresponding to a manual control value is selected, a frequency divided standard pulse signal frequency divided through the frequency dividing circuit 7 and reversible counter 8 is led from the frequency dividing circuit 7 or reversible counter 8 through a corresponding line to a second detecting circuit. Designated at 10 and 11 are memory/call-up transfer gate circuits for switching pulse paths for memorization and for calling and they are controlled from a gate control circuit 12. In the case of the manual control where no memorizing operation takes place, it is switched to the pulse path for calling. The gate control circuit 12 produces a control signal for controlling the memory/call-up transfer gate circuits 10 and 11. Designated at 13 and 14 ar auto/manual transfer gate circuits for switching pulse paths for the automatic control and for the manual control. They are controlled by the auto-manual transfer circuit 2. The reversible counter control circuit 15 is controlled by a signal from the gate control circuit 12 for giving an addition control signal or subtraction control signal to the reversible counter 8.

A first detecting circuit 16 is provided and in the case of the automatic control, it produces a shutter closure signal upon detection of the instant when the memory value in the reversible counter 8 becomes zero. A second detecting circuit 17 is similarly provided and in the case of the manual control, it produces a shutter closure signal when a pulse number corresponding to a manually set control value is reached. Designated at 18 is a shutter control circuit including an electromagnet $M_1$. A operation indicator circuit 19 functions to indicate the operative period of the self-timer or operating state. Designated at 21 is a shutter speed indicator circuit.

The operation of the above system will now be briefly described. First, the case of the automatic control without use of the self-timer is discussed. In this case, the self-timer switch $SW_4$ is not closed, and the self-timer control circuit 1 has no practical effect. Also, the auto-manual transfer circuit 2 is set to an automatic control mode.

When the automatic control mode is set, the auto-manual transfer gate circuits 13 and 14 select the pulse path for the automatic control. By the depression of a camera release button the power source switch is closed to furnish power to the whole system, while at the same time an addition control signal is given from the reversible counter control circuit 15 to the reversible counter 8. Further, the reset pulse generator circuit 3 produces a reset pulse to reset the reversible counter 8 and frequency dividing circuit 7. With the trailing edge of the reset pulse the standard pulse generator circuit 4 starts to produce a standard pulse signal. During the pulse duration of the signal pulse produced from the brightness-time conversion circuit 5 the standard pulse output is permitted through the NOR circuit 6 and memory/-call up transfer gate circuit 10 and appropriately coupled through a selected signal line in the signal line select circuit 9 which is selected according to an exposure time determination factor other than the brightness of the subject field, such as film sensitivity and diaphragm information, to the frequency dividing circuit 7 for frequency division. The resultant output of the frequency divider is led either through the memory/call up transfer gate circuit 11 and auto/manual transfer gate circuit 13 or through the signal line select circuit 9 to the reversible counter 8 for additive memorization there. The shutter speed indicator 21 is controlled by the memorized content to indicate a corresponding shutter speed.

At the end of the single pulse from the brightness-time conversion circuit 5, that is, with the trailing edge of the single pulse, the gate control circuit 12 produces a switching signal to switch the memory/call up transfer gate circuits 10 and 11, while giving a substraction control signal to the reversible counter 8 to render the same into a subtraction control mode and stopping the standard pulse generation of the standard pulse generator 4.

The operation so far takes place before the light incident on the photo-conductive element is shut off due to the rising of the finder mirror caused by the depression of the camera release button in case of a single-lens reflex camera.

With further depression of the camera release button the shutter starts to open, while at the same time the timing switch SW$_3$ is opened by a shutter blade opening member (not shown). After the lapse of a predetermined time provided by the delay circuit 20 the standard pulse generator circuit 4 resumes the standard pulse generation, while at the same time the shutter speed display in the shutter speed indicator circuit 21 is reset. The resumed standard pulse output is permitted through the memory/call up transfer gate circuit 10 to the frequency dividing circuit 7 for frequency division and then coupled through the memory/call up transfer gate circuit 11 and auto/manual transfer gate circuit 13 to the reversible counter 8 for progressive subtraction from the memorized value. When the memorized value becomes zero, the first detecting circuit 16 produces a shutter closure signal for controlling the shutter control circuit 18, thus de-energizing the electromagnet M$_1$ which was previously locking a shutter blade closing member (not shown) to thereby release the shutter blade closing member and close the shutter.

In the case of the manual control without use of the self-timer, the self-timer switch SW$_4$ is again held open. When a manual control value is selected, the auto/-manual transfer gate circuits 13 and 14 select the pulse path for the manual control, and the reversible counter 8 is cascade connected to the frequency dividing circuit 7 such that the standard pulse output of the standard pulse generator circuit 4 is coupled through all the stages of the frequency dividing circuit 7 before going to the reversible counter 8.

Also, the shutter speed indicator circuit 21 is adapted to indicate a shutter speed corresponding to a preset manual control value as will be described hereinafter.

Similar to the case of the automatic control, upon closure of the power source switch with the depression of the camera release button, an addition control signal is given from the reversible counter control circuit 15 to the reversible counter 8, while at the same time the reset pulse generator circuit 3 produces a reset pulse to reset the reversible counter 8 and frequency dividing circuit 7. Also, under the control of a signal from the auto/-manual transfer circuit 2 the brightness-time conversion circuit 5 produces an output signal equivalent to a single pulse at the end thereof, whereby the gate control circuit 12 is controlled to produce a switching signal for switching the memory/call up transfer gate circuits 10 and 11, while controlling the reversible counter 8 to hold the subtraction mode.

Subsequently, with further depression of the camera release button, the shutter starts to open due to the rising of the finder mirror, while at the same time the timing switch SW$_3$ is opened. After the lapse of a predetermined time provided by the delay circuit 20 the standard pulse generator circuit 4 starts the standard pulse generation. The standard pulse output thus produced goes through the memory/call up transfer gate circuit 10 to enter the frequency dividing circuit 7 and is coupled through all the stages thereof before going through the auto/manual transfer gate circuit 13 to the reversible counter 8 for frequency division. The frequency divided standard pulse signal is led through a line leading from a control terminal selected in accordance with the preset manual control value to the second detecting circuit 17, which thereupon delivers a shutter closure signal to the shutter control circuit 18 for de-energizing the electromagnet M$_1$ and closing the shutter. When the self-timer is not used, the self-timer operation indicator 19 is held inoperative.

Now, the case of using the self-timer will be discussed. The self-timer according to the invention is constructed such as to determine the self-timer period through frequency division of the standard pulse output of the standard pulse generator circuit 4 by the cascade connected frequency dividing circuit 7 and reversible counter 8 and also effecting the indication of the self-timer operation by the self-timer operation indicator circuit 19. To this end, in the case of operating the self-timer, the individual control circuits are adapted to produce signals enabling the self-timer operation under the control of a signal from the self-timer control circuit 1.

In the case of the automatic control with the use of the self-timer, the self-timer switch SW$_4$ is closed by setting a self-timer lever (not shown), whereupon the self-timer control circuit 1 is rendered operative, while setting the signal path for automatic control through the auto/manual transfer circuit 2.

Then, by depressing the camera release button, the power source switch is closed to supply power thereby causing the reset pulse generator circuit 3 to produce a reset pulse to reset the frequency dividing circuit 7 and reversible counter 8. At this time, the self-timer control circuit 1 produces and delivers a control signal to each circuit, rendering the reversible counter 8 to be in the addition control mode, setting the memory/call up transfer gate circuit 10 to the pulse path for calling, setting the auto/manual transfer gate circuit 13 to the pulse path for manual control, and connecting the frequency dividing circuit 7 and reversible counter 8 in cascade. At the same time, the control circuit 1 permits the first and second detecting circuits 16 and 17 to provide no output signal coupled to the shutter control circuit 18 so as not to energize the electromagnet M$_1$.

At this time, the electromagnet M$_2$ is energized because of the self-timer operation. After the generation of the afore-said reset pulse, more particularly with the trailing edge of this pulse, the standard pulse generator circuit 4 starts the standard pulse generation. The standard pulse output is coupled through the memory/call up transfer gate circuit 10 to the frequency dividing circuit 7 for frequency division and then coupled through the auto/manual transfer gate circuit 13 to the reversible counter 8 for further frequency division to measure a preset self-timer period. At the end of measurement of the period, the self-timer control circuit 1 produces a self-timer end signal. Meanwhile, the self-timer operation indicator circuit 19 indicates the self-timer operation until the generation of the self-timer end signal. Also, until this time the shutter speed indicator circuit 21 is held inoperative. The self-timer end signal produced from the self-timer control circuit 1 controls each circuit, stopping the standard pulse generation of the standard pulse generator circuit 4, switching the memory/call up transfer gate circuit 10 to the pulse path for memorization, switching the auto/manual transfer gate circuit 13 to the pulse path for automatic control and permitting the first detecting circuits to provide output to the shutter control circuit to be coupled to thereby energize the electromagnet $M_1$. Further, with the self-timer end signal the self-timer operation indicator circuit 19 is rendered inoperative, while at the same time the shutter speed indicator circuit 21 is rendered operative. Simultaneously, the self-timer control circuit 1 produces a reset pulse to reset the frequency dividing circuit 7 and reversible counter 8. At the end of the reset pulse, i.e., with the trailing edge thereof, the standard pulse generator circuit 4 resumes the generation of the standard pulse signal, and during the presence of a single pulse from the brightness-time conversion circuit 5 the standard pulse signal is led through NOR circuit 6 and memory/call up transfer gate circuit 10 and also through a selected signal line in the signal line select circuit 9 which is selected according to the exposure time determination factor other than the subject brightness, such as film sensitivity and diaphragm information, to enter the frequency dividing circuit 7 for frequency division, and then it is coupled either through memory/call up transfer gate circuit 11 and auto/manual transfer gate circuit 13 or through the signal line select circuit 9 to the reversible counter 8 for additive storing. The memorized value is used to control the shutter speed indicator circuit 21 for the indication of a corresponding shutter speed.

At the end of the single pulse from the brightness-time conversion circuit 5, that is, with the trailing edge of this pulse, the gate control circuit 12 produces a switching signal to switch the memory/call up transfer gate circuits 10 and 11, while giving a subtraction control signal to the reversible counter 8 to place it in the subtraction control mode as well as stopping the standard pulse generation of the standard pulse generator circuit 4. Further, at this time the electromagnet $M_2$ in the self-timer control circuit 1 is de-energized. With the de-energization of the electromagnet $M_2$ the mirror starts to rise, and with the mirror up, the timing switch $SW_3$ is opened, while actuating the shutter to start the exposure. (The interlocked operation of the control circuit according to the invention and the shutter system will be discussed in detail in connection with FIG. 2.)

The subsequent operation is the same as in the previous case of the automatic control without use of the self-timer and therefore will not be again discussed.

In the case of the manual control of the exposure time with the use of the self-timer, like the case of the automatic control, the self-timer switch $SW_4$ is closed by setting the self-timer lever. In this case, after selection of a preset manual control value, the camera release button is depressed to close the power source switch, thus energizing the electromagnet $M_2$ similar to the case of the automatic control. At this time, the self-timer control circuit 1 gives a control signal to each circuit for measuring the self-timer period and rendering the self-timer operating indicator circuit 19 operative. At the end of the self-timer operation a self-timer end signal is produced to stop the reference pulse generation of the standard pulse generator circuit 4, while permitting the output signal of the second detecting circuit 17 to the shutter control circuit 18 to energize the electromagnet $M_1$. Further, with the self-timer end signal the self-timer control circuit 1 produces a reset pulse to reset the frequency dividing circuit 7 and reversible counter 8, while controlling each circuit to switch each gate to the pulse path for the manual control. As a result, the output signal of the gate control circuit 12 is inverted to de-energize the electromagnet $M_2$. With the de-energization of the electromagnet $M_2$ the mirror is raised to open the timing switch $SW_3$ thus starting the exposure. The operation after the opening of the timing switch $SW_3$ is the same as in the case of the manual control without use of the self-timer and therefore will not be again discussed.

Figure 2A:
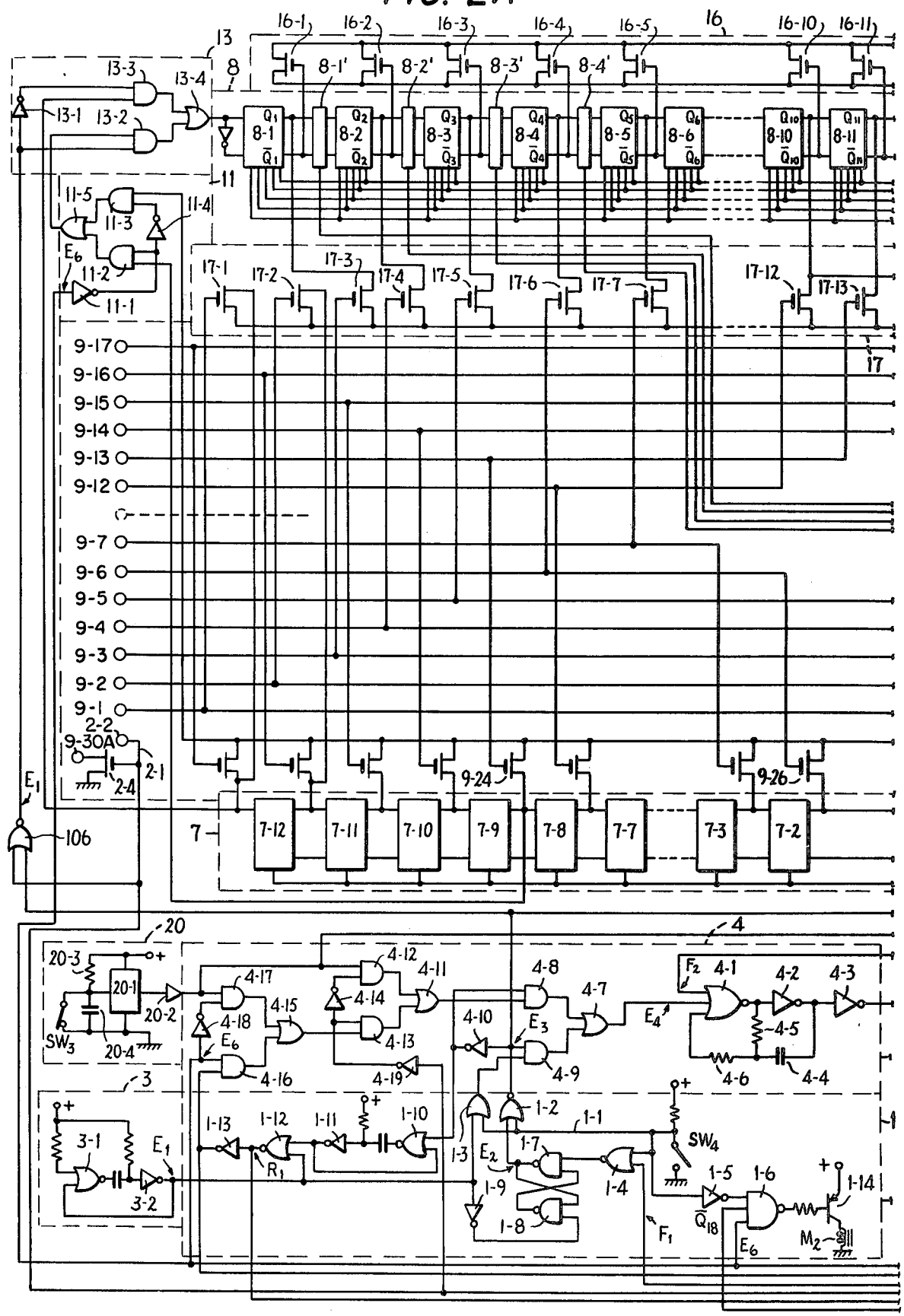
FIG. 2A and 2B are schematic diagram showing a specific example of the FIG. 1 construction.
Figure 2B:
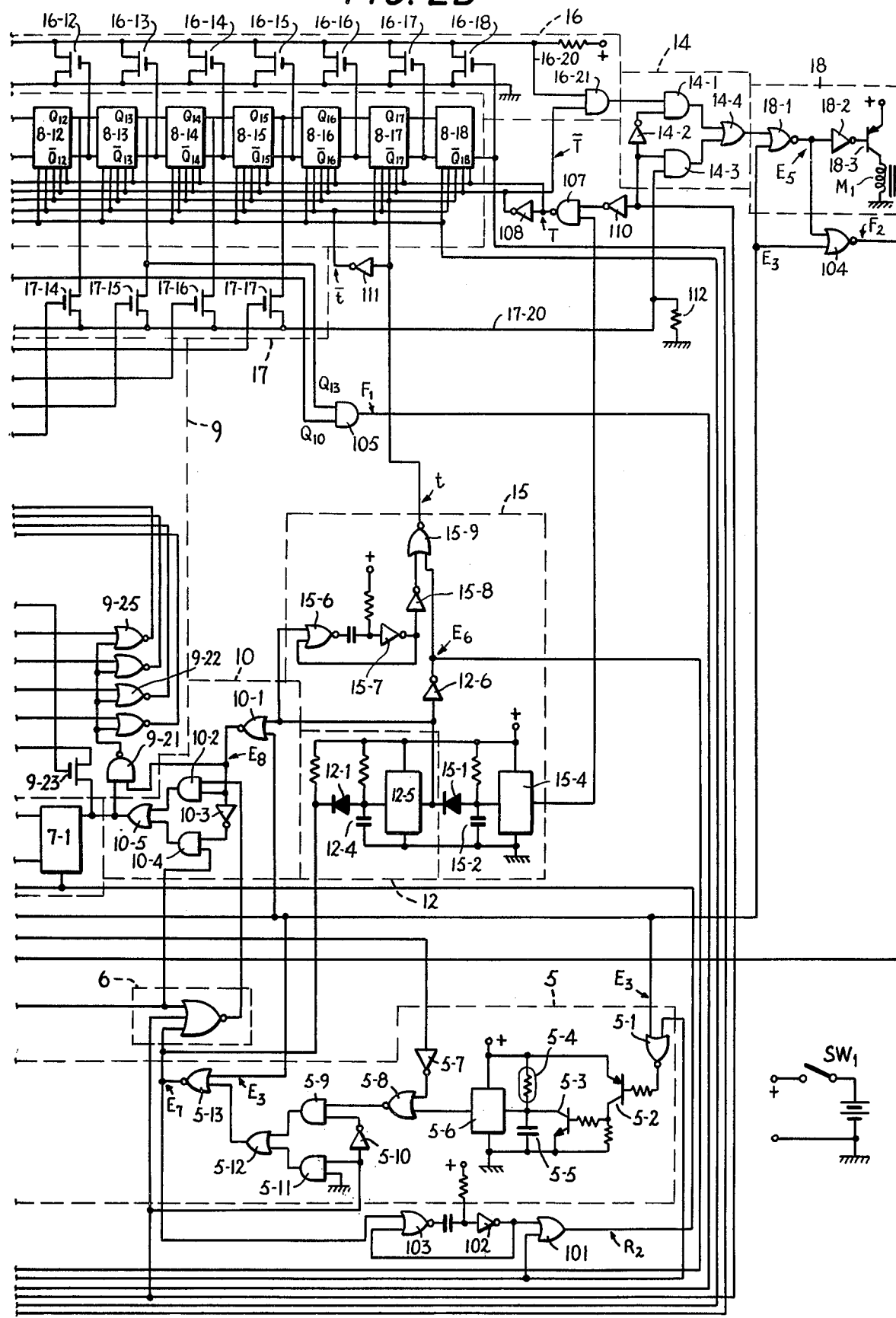

FIG. 2 shows one specific type of circuit construction of the system shown in the block diagram of FIG. 1. The shutter speed indicator circuit 21 will be described later. In the following description, "1" means the high level of the signal, and "0" low level of the signal. The shutter used is assumed to be a focal plane shutter.

At first, the description will be made in connection with the case of the automatic control with the use of the self-timer. In this case, a self-timer lever provided in the camera is previously set to a self-timer position. By so doing, the self-timer switch $SW_4$ is closed. Meanwhile, a movable contact piece 9-20M (described hereinafter in connection with FIG. 3) movable by an auto-manual change-over ring (not shown) is moved to an auto position of the auto/manual transfer circuit 2, i.e., a position for grounding a control terminal 2-2. Further, another movable contact piece 9-20A coupled to a stop ring and film sensitivity setter ring (not shown) is suitably moved according to the particular photographing conditions.

Then, with the depression of the camera release button, the power switch $SW_1$ for supplying power to the whole circuit of the system is closed by a pin (not shown) mounted on a release plate (not shown). With further depression of the camera release button the release plate is locked in position by a lock lever (not shown). So long as the release lever is locked, the power switch $SW_1$ will not be opened by returning the release button to the initial position. The releasing of the lock lever is effected after the end of the exposure and at an instant when the mirror is returned to the initial position as is well known in the art.

Since the control terminal 2-2 is grounded while the self-timer switch $SW_4$ is closed, signal 0 prevails on control line 2-1 and self-timer control line 1-1. Meanwhile, upon closure of the power switch $SW_1$ a single positive pulse is produced as the output $E_1$ of the reset pulse generator circuit 3, which comprises a mono-stable multi-vibrator constituted by NOR circuit 3-1, inverter 3-2, etc.

This 1 signal as the output $E_1$ goes to a NOR circuit 1-12, which thus produces 0 signal as its output $R_1$ for resetting the reversible counter 8 (which is reset with 0 signal). The output $E_1$ is also coupled through an inverter 1-9 to an R-S flip-flop constituted by NAND circuits 1-7 and 1-8 for resetting the same (this R-S flip-flop will be described later), thus rendering 0 the output $E_2$ of the NAND circuit 1-7. With this output, a NOR circuit 1-2 produces 1 signal as its output $E_3$ since 0 signal on the self-timer control line 1-1 prevails at its other input terminal. Meanwhile, with 1 signal as the output $E_1$, during the presence of which the output $R_1$ is 0 as mentioned earlier, an OR circuit 101 receiving the output of an inverter 1-13 produces 1 signal as its output $R_2$ to reset the frequency dividing circuit 7 (which is adapted to be reset with 1 signal). The 1 output $E_1$ is further coupled through an OR circuit 1-3, an AND circuit 4-9 and an OR circuit 4-7 to produce a 1 signal added as input $E_4$ to an input terminal of a NOR circuit 4-1 (this takes place since the output $E_3$ is 1 as mentioned earlier, providing an input 1 to one of the input terminals of the AND circuit 4-9). The output $E_3$ is also coupled to NOR circuits 5-1, 5-13, 10-1, 104 and 106, so that all these circuits provide 0 as their output. As a result, transistors 5-2 and 5-3 of the brightness-time conversion circuit 5 are rendered on, so that a capacitor 5-5 remains uncharged, permitting a switching circuit 5-6 to provide 0 output. The output $E_7$ of the NOR circuit 5-13 is coupled to the gate control circuit 12, so that a diode 12-1 is biased on to hold a capacitor 12-4 uncharged, thus permitting a switching circuit 12-5 to provide 0 output. Hence, a switching circuit 15-4 provides 0 output, so that the output T of a NAND circuit 107 is 1, permitting 0 output $\overline{T}$ from an inverter 108. The output of the switching circuit 12-5 is inverted through an inverter 12-6, which thus produces 1 output $E_6$ coupled to a NOR circuit 15-9. The NOR circuit 15-9 thus provides 0 as its output t, permitting an inverter 111 to provide 1 output $\bar{t}$ added as addition signal to the reversible counter 8. The NOR circuit 104, which receives the output $E_3$ at 1, produces 0 signal as its output $F_2$ added to a NOR circuit 4-1. The output $E_3$ at 1 is further added to a NOR circuit 18-1 in the shutter control circuit 18, so that the NOR circuit 18-1 provides 0 as its output $E_5$ coupled through an inverter 18-2 to a transistor 18-3, so that the transistor 18-3 is off, permitting no current to the electromagnet $M_1$. Meanwhile, so long as the output $E_1$ is 1, the reversible counter 8 is reset as mentioned earlier, so that the Q output of each counter stage consisting of a reversible binary counter circuit is 0.

In consequence, the output $F_1$ of an AND circuit 105 receiving the Q outputs of the counter stages 8-10 and 8-13 is 0. This 0 output $F_1$ goes to the NOR circuit 1-4, whose other input is also 0 as mentioned earlier so that it provides 1 output added as one of the inputs to the NAND circuit 1-7. The R-S flip-flop constituted by the NAND circuits 1-7 and 1-8 will now be discussed. Upon closure of the power source the NAND circuit 1-8 receives the output of the inverter 1-9 receiving the output $E_1$, so that it provides 1 output. Consequently, both inputs to the NAND circuit 1-7 in the illustrated connection are 1, and the output $E_2$ thereof is 0. This output goes to an NOR circuit 1-2. Hence, both inputs to the NOR circuit 1-2 are 0, and the output $E_3$ thereof is 1. Meanwhile, a NAND circuit 1-6 of the self-timer control circuit 1 receives at its three input terminals a 1 signal from an inverter 1-5 inverting the 0 signal on the self-timer control line 1-1, a signal $E_6$ which is 1 and 1 output $\overline{Q}_{18}$ of the final counter stage 8-18 of the reversible counter 8, so that it produces 0 output, triggering a transistor 1-14 to energize an electromagnet $M_2$. With the activation of this magnet $M_2$ a mirror lock pawl engaging with a mirror drive member (not shown) for raising the mirror is locked. Since the mirror lock pawl which is adapted to be otherside or normally moved by the release plate at the end of the depressing stroke of the release plate is thus locked by the electromagnet $M_2$, the mirror will not start to rise even if the release plate is lowered. Meanwhile, though the electromagnet $M_1$ adapted to lock the rear screen is not energized, no trouble will arise by so arranging as to lock the rear screen by well-known means, for instance a hold lever, before the rising of the mirror.

A NOR circuit 1-10 in the self-timer control circuit 1 constitutes together with an inverter 1-11 a mono-stable multivibrator. This multi-vibrator is triggered when the output of an inverter 4-10, that is, the output $E_3$ becomes 0, becomes 1 while its output, i.e., output of the inverter 1-11, remains 0 so long as the output of the inverter 4-10 is 0.

The operation at the instant when the output $E_1$ of the reset pulse generator circuit 3 becomes 0 will now be discussed. At this instant, the output $R_1$ of the NOR circuit 1-12 becomes 1, releasing the reset state of the reversible counter 8. Also, it goes through an inverter 1-13 to an OR circuit 101, rendering the output $R_2$ thereof 0 to release the reset state of the frequency dividing circuit 7. At this time, 0 input prevails at the other input terminal of the OR circuit 101 (because a mono-stable multi-vibrator constituted by NOR circuits 103 and 104 is not triggered since the output $E_7$ of the NOR circuit 5-13 is 0 as mentioned earlier).

Simultaneously with the releasing of the reset state of the reversible counter 8 and frequency dividing circuit 7, the output of the OR circuit 1-3 becomes 0 to change the outputs of the AND circuit 4-9 and or circuit 4-7 to 0, thus changing the input $E_4$ to the NOR circuit 4-1 to 0, so that the restandard pulse generator comprising NOR circuit 4-1, inverters 4-2 and 4-3, capacitor 4-4 and resistors 4-5 and 4-6 starts generation of standard pulses. The repetition frequency of the standard pulse signal is substantially determined by the capacitor 4-4 and resistor 4-5, and for the following description it is assumed to be 2.048 MHz.

The standard pulse signal is coupled to a NOR circuit 6 and an AND circuit 10-4 of the memory/call up transfer gate circuit 10. It also passes through the NOR circuit 6, to which the 0 signal on the control line 2-1 and the 0 output $E_7$ of the NOR circuit 5-13 are also added, but it is not permitted through an AND circuit 10-2 of the memory/call up transfer gate circuit 10 since the output $E_8$ of a NOR circuit 10-1 is 0 (with the output $E_3$ being 1 and the output of the switching circuit 12-5 being 0). Meanwhile, since a 1 signal from an inverter 10-3 inverting the 0 output $E_8$ of the NOR circuit 10-1 is added to an AND circuit 10-4 of the memory/call up transfer gate circuit 10, the standard pulse going to the other input terminal of the AND circuit 10-4 passes through this circuit and an OR circuit 10-5 to the frequency dividing circuit 7 and a NAND circuit 9-21 in the signal line select circuit 9. Since the output $E_8$ of the NOR circuit 10-1 in the memory/call up transfer gate circuit 10 is added to the NAND circuit 9-21, the standard pulse permitted through the OR circuit 10-5 is not permitted through the NAND circuit 9-21. Further, the frequency divided standard pulse output in the frequency dividing circuit 7 is coupled through the signal line select circuit 9 to an AND circuit 11-3 of the memory/call up transfer gate circuit 11. At this time, the 1 output $E_6$ of the inverter 12-6 in the gate control circuit 12 is added to an inverter 11-1 of the memory/call up transfer gate circuit 11, and also a 1 signal is coupled through inverters 11-1 and 11-4 to one input terminal of an AND circuit 11-3 in the memory/call up transfer gate circuit 11. Consequently, the frequency divided standard pulse output of the frequency dividing circuit 7 is permitted through the OR circuit 11-5 to an AND circuit 13-2 in the auto/manual transfer gate circuit 13. Further, since one of the inputs to an AND circuit 11-2 in the memory/call up transfer gate circuit 11 is 0 as is apparent from the Figure, this AND circuit 11-2 provides 0 output irrespective of its other input. The output of the last stage of the frequency dividing circuit 7 is coupled to an AND circuit 13-3 in the auto/manual transfer gate circuit 13. This output is permitted through the AND circuit 13-3 since at this time the output $E_9$ of the NOR circuit 106 is 0 as mentioned earlier, and which is coupled through an inverter 13-1 to the other input terminal of the AND circuit 13-3 while it also goes directly to the AND circuit 13-2 to cut off the same. In consequence, the last stage output of the frequency dividing circuit 7 is permitted through AND circuit 13-3 and OR circuit 13-4 in the auto/manual transfer gate circuit 13 to the reversible counter 8. Thus, the standard pulse produced from the standard pulse generator circuit 4, consisting of NOR circuit 4-1 and inverters 4-2 and 4-3 is frequency divided through the cascade connected frequency dividing circuit 7 and reversible counter 8. While in the Figure some stages of the frequency dividing circuit 7 and reversible counter 8 are omitted, the frequency divider consists of 12 stages, and the reversible counter consists of 18 stages. Through the frequency division of the frequency of 2.048 MHz, one second after the start of the oscillation the Q output of the tenth stage 8-10 of the reversible counter 8 is inverted from 0 to 1, and 8 seconds afterwards the Q output of the thirteenth stage 8-13 is inverted from 0 to 1.

At this instant, the input signal $Q_{13}$ to the self-timer operation indicator circuit 19 comprising a NAND circuit 19-1, a transistor 19-2 and a light emitting diode 19-3 is inverted from 0 to 1, whereupon the output of the NAND circuit 19-1 becomes 0 to trigger the transistor 19-2, thus causing the light-emitting diode 19-3 to glow. By the action of the light-emitting diode 19-3 the end of the self-timer period is forecast in the case of using the self-timer. To this end, the light-emitting diode is provided in the camera such that its glow can be recognized by the user from a position well distant from the camera. With further standard pulse input to the reversible counter 8 both outputs $Q_{10}$ and $Q_{13}$ of the tenth and thirteenth stages 8-10 and 8-13 become 1 9 seconds afterwards. This means that by setting the self-timer period to 9 seconds and taking the AND of the Q outputs of these stages 8-10 and 8-13 the self-timer period of 9 seconds can be measured. The AND circuit 105 takes this AND, and with the inversion of its output $F_1$ from 0 to 1 the output of the NOR circuit 1-4 becomes 0 to cause the inversion of the output $E_2$ of the NAND circuit 1-7 to 1, whereupon the output $E_3$ of the NOR circuit 1-2 becomes 0. Also, with the inversion of the output $E_3$ to 0 the output of the NAND circuit 19-1 in the self-timer indicator 19 becomes 1 to cut off the transistor 19-2 so that the light-emitting diode 19-3 ceases to glow. This means that the light-emitting diode 19-3 glows only for one second before the end of the self-timer period. In this way, the camera user can acknowledge the end of the self-timer period.

When the output $E_3$ becomes 0, the output of the AND circuit 4-9 also becomes 0. At this time, the output of the AND circuit 4-8 simultaneously changes from 0 to 1 to change the output of the OR circuit 4-7 to 1, so that 1 signal appears as the input $E_4$ to the NOR circuit 4-1 to stop the oscillation. The reason why the output of the AND circuit 4-8 changes from 0 to 1 at this time will now be discussed.

The output $E_6$ of the inverter 12-6 of the gate control circuit 12 is coupled to an AND circuit 4-16 in the standard pulse generator circuit 4, while it is also coupled through an inverter 4-18 to an AND circuit 4-17. To the other input terminal of the AND circuit 4-17 is coupled a 1 signal from an inverter 20-2 inverting the output of a switching circuit 20-1, the output of which is inverted from 0 to 1 a predetermined period after the opening of a timing switch $SW_3$ (which is still closed at this time as will be described hereinafter). Thus, with 1 and 0 inputs the output of the AND circuit 17-4 is 0. Added to the other input terminal of the AND circuit 4-16, to which the signal $E_6$ at 1 is directly added, is the output of the inverter 1-13. With the inversion of the signal level of the output $E_3$ from 1 to 0 the mono-stable multivibrator consisting of NOR circuit 1-10 and inverter 1-11 is triggered to change the output of the inverter 1-11 to 1, and this 1 signal is coupled through a NOR circuit 1-12 to the inverter 1-13, which thus provides 1 output to the AND circuit 4-16. Thus, the output of the AND circuit 4-16 is inverted to 1 and is coupled through an OR circuit 4-15 to an AND circuit 4-13. Since coupled through an inverter 4-19 to the other input terminal of the AND circuit 4-13 is the 0 signal on the control line 2-1, the output of the AND circuit 4-13 is inverted to 1 and coupled through an OR circuit 4-11 to the AND circuit 4-8. Hence, the output of the AND circuit 4-8 changes from 0 to 1.

The inversion of the output $E_3$ from 1 to 0 also has effects upon the NOR circuit 10-1 in the memory/call up transfer circuit 10, NOR circuit 18-1 in the shutter control circuit 18, NOR circuit 104, NOR circuits 5-1 and 5-13 in the brightness-time conversion circuit 5 and NOR circuit 106, and this will now be discussed. When the output $E_3$ added to the NOR circuit 10-1 in the memory/call up transfer gate circuit 10 becomes 0, the output $E_8$ of the NOR circuit 10-1 becomes 1 since 0 input prevails at the other input terminal. Also, with the inversion of the output $E_3$ the output $E_5$ of the NOR circuit 18-1 in the shutter control circuit 18 becomes 1 since 0 input prevails at the other input terminal as will be described hereinafter. This 1 signal $E_5$ goes to the NOR circuit 104 to change the output $F_2$ thereof to 0, while it causes an inverter 18-2 to provide output 0 to the base of a transistor 18-3, thus triggering the transistor 18-3 to energize the electromagnet $M_1$. With the activation of the electromagnet $M_1$, the rear screen is locked by both the hold lever and electromagnet $M_1$.

Further, with the 0 output $E_3$ the output $E_9$ of the NOR circuit 106, to the other input terminal of which the 0 signal on the control line 2-1 is added, becomes 1. The NOR circuit 5-13 in the brightness-time conversion circuit 5 holds its 0 output even with the inversion of the output $E_3$ from 1 to 0 since 1 input prevails at its other input terminal as will be described hereinafter. The NOR circuit 5-1 in the brightness-time conversion circuits also holds its 0 output with the inversion of the output $E_3$ from 1 to 0, because 1 signal is coupled through NOR circuit 1-12 and inverter 1-13 to its other input terminal due to the inversion of the output of the inverter 1-1 constituting the mono-stable multi-vibrator together with the NOR circuit 1-10 to 1. The output of the mono-stable multi-vibrator consisting of the NOR circuit 1-10 and inverter 1-11 and triggered upon inversion of the output $E_3$ from 1 to 0 becomes 1 as mentioned earlier, thus inverting the output $R_1$ of the NOR circuit 1-12 to 0 to reset the reversible counter 8 once again while inverting the output of the inverter 1-13 to 1 and hence the output $R_2$ of the OR circuit 101 to 1 to thereby reset the frequency dividing circuit 7 once again. With the subsequent recovery of the initial stable state of the mono-stable multi-vibrator, that is, with the returning of the output of the inverter 1-11 to 0, the output of the NOR circuit 1-12 becomes 1 to release the reset state of the reversible counter 8, while it also inverts the output $R_2$ of the OR circuit 101 to 0 through the inverter 1-13 to thereby release the reset state of the frequency dividing circuit 7. Further, since the output of the inverter 1-13 becomes 0 this 0 output coupled through AND circuit 4-16, OR circuit 4-15, AND circuit 4-13, OR circuit 4-11 and AND circuit 4-8 to the OR circuit 4-7 causes the output $E_4$ thereof to be changed to 0, thus causing the standard pulse generation to be resumed.

Simultaneously with the resumption of the standard pulse generation, 0 signal is added from the inverter 1-13 as one of the inputs to the NOR circuit 5-1 in the brightness-time conversion circuit 5, so that the NOR circuit 5-1 now provides 1 output to render both the transistors 5-2 and 5-3 non-conductive, so that the charging of a capacitor 5-5 through a photo-conductive element 5-4 is started. The photo-conductive element 5-4 consists of Cds or the like material which is capable of offering varying resistance according to the brightness of the subject, and in an inside light detection type single-lens reflex camera it is disposed at a position to receive light permitted through the lens and reflected by the mirror. The junction between the photo-conductive element 5-4 and capacitor 5-5 is connected to the input side of the switching circuit 5-6, whose output is connected to one input terminal of the NOR circuit 5-8. Normally, the output signal of the switching circuit 5-6 is held 0, and this 0 output is added to the NOR circuit 5-6, which also receives the output of an inverter 5-8 inverting a 1 output signal of an inverter 20-2 in the delay circuit 20, and whose output is thus held 1. This 1 signal goes to an AND circuit 5-9, which also receives at its other input terminal the output of an inverter 5-10 inverting the 0 signal on the control line 2-1 so that its output is held 1 and coupled through an OR circuit 5-12 to a NOR circuit 5-13 to hold the output $E_7$ thereof to be 0.

As mentioned earlier, with the start of charging of the capacitor 5-5, the standard pulse output of the standard pulse generator 4 is permitted through the NOR circuit 6 and to the AND circuit 10-2 in the memory/call up transfer gate circuit 10. The output $E_8$ of the NOR circuit 10-1 is 1 at this time as mentioned earlier, so that the AND circuit 10-2 is given 1 signal to permit the other input while the AND circuit 10-4 is given 0 signal to block the other input. The standard pulse input to the AND circuit 10-2 is thus permitted through the AND circuit 10-2 and OR circuit 10-5 to enter a NAND circuit 9-21 of the signal line select circuit 9 and also the frequency dividing circuit 7. The signal line select circuit 9 has control terminals 9-1, 9-2, ...9-16, 9-17 which are partly omitted in the Figure. As will be described hereinafter in detail, one of the control terminals is grounded according to film sensitivity and diaphragm information and provides 0 signal.

Figure 12:
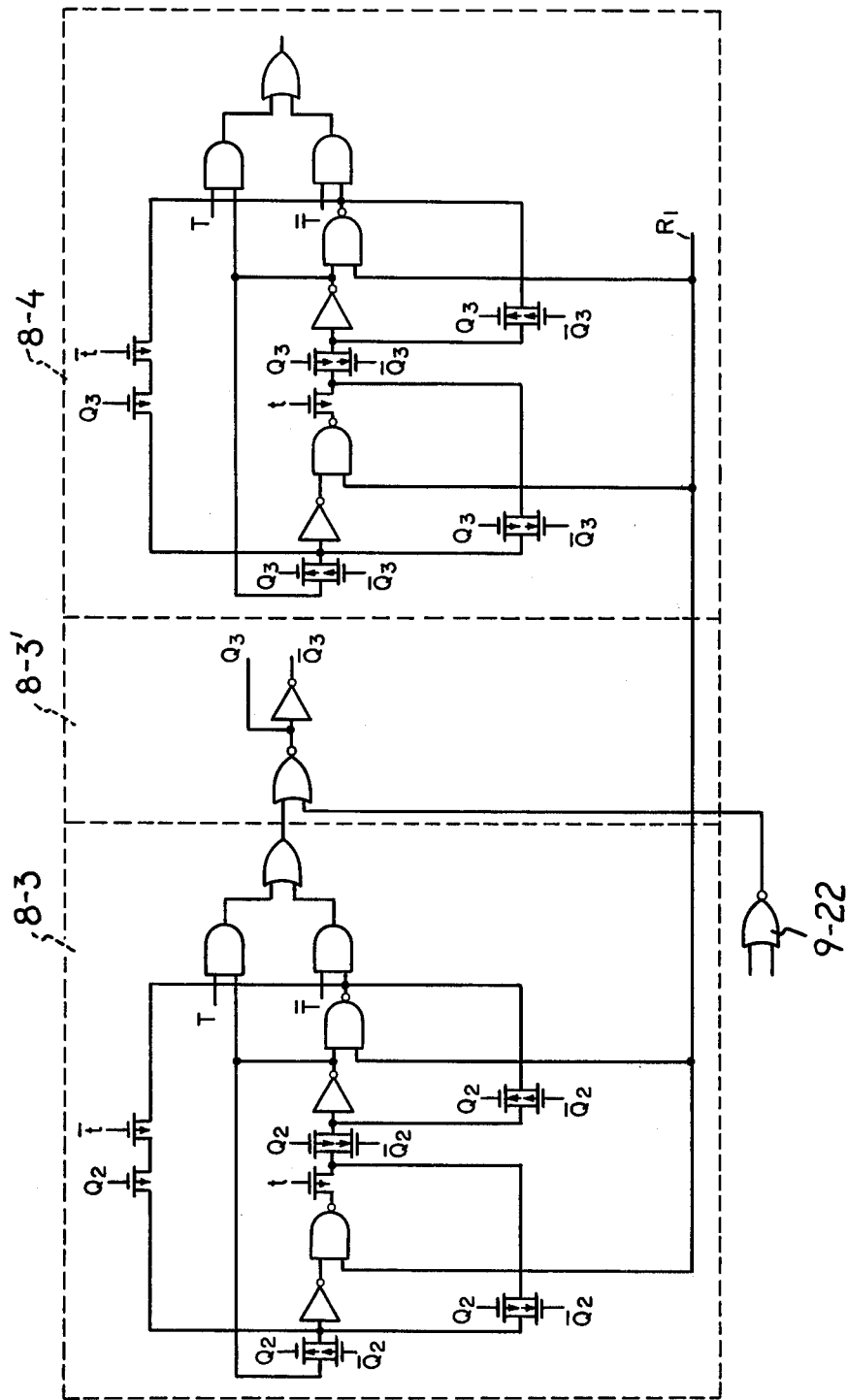
FIG. 12 is a circuit diagram showing the details of two counter stages shown in block form in FIGS. 2A and 2B.

These control terminals are connected to the gates of associated switching elements or one of the input terminals of associated NOR circuits. When the signal on a control terminal becomes 0, the associated switching element is rendered conductive or an input added to the other input terminal of the associated NOR circuit is permitted therethrough. For example, when the control terminal 9-2 is selected with its signal level inverted to 0, the standard pulse output of the NOR circuit 10-5, having been permitted through the NAND circuit 9-21 receiving at the other input terminal thereof the 1 output $E_8$, is also permitted through a NOR circuit 9-22 controlled from the control terminal 9-2 to enter a gate 8-3' between the third and fourth stages 8-3 and 8-4 of the reversible counter 8. The structure of each counting stage 8-1 to 8-18 and that of the gates 8-1' to 8-4' is of known construction and is representatively illustrated in FIG. 12 which shows the circuitry of the third and fourth counter stages 8-3 and 8-4 with the gate 8-3' interposed therebetween. When the control terminal 9-5 is selected to provide 0 signal, the associated switching element 9-23 is turned conductive, whereupon the output thereof is coupled to the AND circuit 11-3 in the memory/call up transfer gate circuit 11 and permitted through the auto/manual transfer gate circuit 13 to the reversible counter 8. Further, when the control terminal 9-13 is selected to provide 0 signal, the associated switching circuit 9-24 is turned conductive, whereby the frequency divided standard pulse output frequency divided through the stages 7-1 to 7-8 is coupled through the switching element 9-24 to the AND circuit 11-3 in the memory/call up transfer gate circuit 11 and then through the auto/manual transfer gate circuit 13 to the reversible counter 8. (At this time, 1 input prevails at one input terminal of the AND circuit 11-3 in the memory/call up transfer gate circuit 11 since the output $E_6$ is 1 as mentioned earlier, thus permitting the input signal to the other input terminal through this AND circuit 11-3 and OR circuit 11-5, while the 1 signal $E_9$ as mentioned earlier is added to one input terminal of the AND circuit 13-2 in the auto/manual transfer gate circuit 13, permitting the input to the other input terminal through this AND circuit 13-2 and OR circuit 13-4.)

In the above way, the standard pulse input to the reversible counter 8 is additively counted therein.

When the terminal voltage of the capacitor 5-5 in the brightness-time conversion circuit 5 and which is charged in the afore-mentioned way reaches a predetermined potential after the lapse of a period corresponding to the brightness of the subject, the output of the switching circuit 5-6 is inverted from 0 to 1. The period from the start of charging of the capacitor 5-5 till the inversion of the output of the switching circuit 5-6 from 0 to 1 is determined by the resistance of the photo-conductive element 5-4 and capacitance of the capacitor 5-5 and is inversely proportional to the brightness of the subject, that is, short with high subject brightness and long with low subject brightness. The output of the switching circuit 5-6 inverted from 0 to 1 is held, and this 1 signal goes to a NOR circuit 5-8 to invert the output thereof to 0 signal coupled through AND circuit 5-9 and OR circuit 5-12 to the NOR circuit 5-13 to invert the output $E_7$ thereof from 0 to 1, thus cutting off the NOR circuit 6 to block the standard pulse.

Consequently, a pulse number corresponding to the brightness of the subject is counted and memorized in the reversible counter 8. In other words, assuming the same film sensitivity and diaphragm aperture, a smaller pulse number is memorized in the reversible counter 8 for a higher subject brightness, and a greater pulse number for a lower brightness.

The memory content of the reversible counter 8 is indicated, for instance within the finder, as shutter speed by the shutter speed indicator as will be described hereinafter in detail. Upon inversion of the output $E_7$ of the NOR circuit 5-13 from 0 to 1, the mono-stable multivibrator consisting of NOR circuit 103 and inverter 102 is triggered, whereby the output of the inverter 102 is held 1 for a constant period while it is coupled through the OR circuit 101 to the frequency dividing circuit 7 to reset the same. Meanwhile, with the inversion of the output $E_7$ from 0 to 1 a diode 12-1 in the gate control circuit 12 is cut off, causing the charging of a capacitor 12-4 to be started, and after the lapse of a predetermined period the output of the switching circuit 12-5 is inverted from 0 to 1. Thereupon, the output $E_6$ of the NOR circuit 10-1 in the memory/callup transfer gate circuit 10 is inverted to 0 to cut off the AND circuit 10-2 and turn the AND circuit 10-4 conductive. Further, with the inversion of the output of the switching circuit 12-5 the output $E_6$ of the inverter 12-6 is inverted from 1 to 0. Also, with the inversion of the output of the switching circuit 12-5 from 0 to 1 a monostable multivibrator consisting of NOR circuit 15-6 and inverter 15-7 is triggered to produce an output coupled through an inverter 15-8 to a NOR circuit 15-9, so that the output t thereof is held 1 for a constant period. This 1 signal is coupled both directly and through an inverter 111 to the reversible counter 8.

Meanwhile, with the inversion of the output of the switching circuit 12-5 from 0 to 1 a diode 15-1 is cut off, causing the charging of a capacitor 15-2, and after the lapse of a predetermined period the output of the switching circuit 15-4 is inverted from 0 to 1. This 1 signal goes to the NAND circuit 107. Since at this time the 0 signal on the control line 2-1 is coupled through the inverter 110 to the other input terminal of the NAND circuit 107, the output T thereof is inverted from 1 to 0 while the output $\overline{T}$ is inverted from 0 to 1, thus rendering the reversible counter 8 to the subtraction control state. The inversion of the signals T and $\overline{T}$ is made to take place during the 1 period of the output of the inverter 15-7 constituting the mono-stable multivibrator together with the NOR circuit 15-6, that is, during the 1 period of the output t of the NOR circuit 15-9. This is made so for the purpose of holding the memory content of the reversible counter 8 unchanged when the reversible counter 8 is swithced from the addition control state to the subtraction control state. The construction of the reversible counter and the effects of the control signals are discussed in the aforementioned U.S. application Ser. No. 499,995, and are not further discussed here. With the inversion of the output $E_6$ from 1 to 0 the AND circuit 4-16 in the standard pulse generator 4 is cut off, while 1 signal provided to the AND circuit 4-17, which thus produces 1 output coupled through the OR circuit 4-15 and AND circuit 4-13 to invert the output of the OR circuit 4-7 to 1, thus inverting the input $E_4$ to the NOR circuit 4-1 to 1 to stop the pulse generation once again. Simultaneously, 0 signal appears at one input terminal of the AND circuit 11-3 to cut off the same AND circuit 11-3, while 1 signal appears at one input terminal of the AND circuit 11-2, which is thus rendered conductive with respect to the input to its other input terminal.

Further, since the NAND circuit 1-6 in the self-timer control circuit 1 receives the output $E_6$ as its one input, with the inversion of the signal $E_6$ from 1 to 0 its output is inverted to 1 to turn the transistor 1-14 non-conductive and thus de-energize the electromagnet $M_2$.

With the de-energization of the electromagnet $M_2$ the mirror lock pawl that has previously been locked is released from engagement with the mirror drive member by a spring (not shown). As a result, the mirror drive member is permitted to rotate for raising the mirror.

After the mirror is raised to an upper set position, a front screen lock pawl in engagement with the front screen is released to start the run of the front screen, that is, exposure. While the hold lever which had been locking the rear screen is simultaneously released, the run of the rear screen is not started since the magnet $M_1$ is operative. Substantially simultaneously with the start of run of the front screen the timing switch $SW_3$ is opened by a front screen drive member (not shown). The photo-conductive element 5-4 is shut off the incident light due to the mirror-up, but this has no effect upon the circuit since the 1 output of the switching circuit 5-6 is held.

After the opening of the timing switch $SW_3$, the charging of a capacitor 20-4 in the delay circuit 20 through a resistor 20-3 is started, and after the lapse of a predetermined period the output of the switching circuit 20-1 is inverted from 0 to 1. This delay circuit is provided to the end of timing the start of the actual exposure at the start of opening of the front screen to the calling of the memory content as is mentioned in the specification of Patent application Ser. No. 95,006/1973.

With the inversion of the output of the switching circuit 20-1 from 0 to 1, the shutter speed indicator circuit is reset through an inverter 20-2, while 0 signal is given to the AND circuit 4-17 and coupled through OR circuit 4-15 and AND circuit 4-13 to invert the output of the OR circuit 4-7 and hence the input $E_4$ to the NOR circuit 4-1 to 0, causing the pulse generation to be started for the third time. At this time the NOR circuit 6 is off since the output $E_7$ is 1, and the standard pulse generated goes through the AND circuit 10-4 and OR circuit 10-5 to the frequency dividing circuit 7. Also at this time, the AND circuit 11-3 in the memory/call up transfer gate circuit 11, the AND circuit 13-3 in the auto/manual transfer gate circuit 13 and NAND circuit 9-21 are off, so that the signal can be permitted only through the path consisting of AND circuit 11-2 and OR circuit 11-5 in the memory/call up transfer gate circuit 11 and AND circuit 13-3 and OR circuit 13-4 in the auto/manual transfer gate circuit 13.

Thus, the standard pulse input to the frequency dividing circuit 7 is frequency divided through eight stages of the frequency dividing circuit 7 to provide a frequency of 8 kHz for starting the subtractive counting in the reversible counter 8.

A frequency lower than that used at the time of memorizing is used at the time of calling out the memory content for the purpose of reducing the time required for the memorization as mentioned in U.S. application Ser. No. 499,995.

The detecting circuits will now be discussed. In the case of the automatic control, the shutter closure signal is detected by the first detecting circuit 16 and the second detecting circuit 17 which serves in the case of the manual control will be discussed later. The first detecting circuit 16 comprises switching elements 16-1, 16-2, ..., 16-8 with the gate terminal connected to the $\overline{Q}$ output side of the respective stages 8-1, 8-2, ..., 8-18 of the reversible counter 8 and an AND circuit 16-21. As the reversible counter 8 receives its pulse input and the number of input pulses is memorized, at least one of the outputs $\overline{Q}_1, \overline{Q}_2, ..., \overline{Q}_{18}$ becomes 0, whereupon the associated switching element in the first detecting circuit 16 is triggered with 0 input appearing at its gate, thus causing 0 signal at appear on an automatic detection line 16-20 and added to the AND circuit 16-21. Also, at the time of memorization the $\overline{T}$ signal is added to the other input terminal of the AND circuit 16-21, so that the output thereof is inverted to 0. This 0 signal goes to the AND circuit 14-1 in the auto/manual transfer gate circuit 14, inverting the output thereof to 0 to cause the OR circuit 14-4 to provide 0 output coupled to the NOR circuit 18-1 in the shutter control circuit 18. (At this time, the 0 signal on the control line 2-1 prevails at one of the input terminals of the AND circuit 14-3, while a 1 output of the inverter 14-2 is added to the other input terminal of the AND circuit 14-1.)

When the frequency divided standard pulse input is applied to the reversible counter 8, the memory value stored therein is called out. When the memory value becomes zero, all the $\overline{Q}$ outputs $\overline{Q}_1, \overline{Q}_2, ..., \overline{Q}_{18}$ of the respective stages become 1. At this time the output $\overline{T}$ is 1, so that the AND circuit 16-21, AND circuit 14-1 and OR circuit 14-4 respectively provide 1 output, thus inverting the output $E_5$ from 0 to 1. Thus, 1 signal is given through the inverter 18-2 to the base of the transistor 18-3 to cut off the transistor 18-3, whereupon the electromagnet $M_1$ is de-energized. Simultaneously, the output $F_2$ of the NOR circuit 105 is inverted to 1 because both the outputs $E_5$ and $E_3$ become 0. With 1 signal thus appearing at the input terminal $F_2$ of the NOR circuit 4-1 of the standard pulse generator circuit 4 the pulse generator circuit 4 the pulse generation is stopped.

With the de-energization of the electromagnet $M_1$ the run of the rear screen is caused to end the exposure. Meanwhile, with the running of the rear screen the lock lever having previously been locking the release plate is released from engagement with the release lever, whereby the release lever is restored to its initial position.

Other detailed features than described above will now be mentioned. The last stage 8-18 of the reversible counter 8 has a function of holding, upon inversion of its $Q_{18}$ to 1 due to the previous stage, this last stage irrespective of a subsequent pulse input. (The circuit construction of this counter circuit is described in detail in U.S. application Ser. No. 499,977.) The $\overline{Q}_{18}$ output of this stage is added to the NAND circuit 1-6 in the self-timer control circuit 1.

In case when the brightness of the subject is very low or when the release is made while the lens is covered with a cap and the self-timer lever set to the self-timer position, light indicent on the photo-conductive element 5-4 is very little, so that the memorizing period after the end of the self-timer period is very long. In such case, the switching circuit 5-6 in the brightness-time conversion circuit 5 continues to provide 0 output. While according to the invention the inversion of the output of the switching circuit 5-6 from 0 to 1 is utilized to effect the de-energization of the self-timer control magnet $M_2$ to thereby cause the mirror-up and start the exposure as mentioned earlier, the electromagnet $M_2$ will remain energized so long as the switching circuit 5-6 continues to provide 0 output. In this case, the exposure will not be started even after a long time. To eliminate this drawback, according to the invention, upon inversion of the $\overline{Q}_{18}$ signal of the last stage 8-18 to 0 this 0 signal is coupled to the NAND circuit 1-6 to forcibly de-energize the electromagnet $M_2$, thus causing the mirror to be raised to start the run of the rear screen while opening the timing switch $SW_3$. At this time, even if the output of the switching circuit 5-6 in the brightness-time conversion circuit 5 is still 0, a signal equivalent to one resulting from the inversion of the output of the switching circuit 5-6 is produced through the coupling of the output of the inverter 20-2 in the delay circuit 20 actuated by the timing switch $SW_3$ through the inverter 5-7 to the NOR circuit 5-8 and inversion of the output of the delay circuit 20, the equivalent signal being coupled to the NOR circuit 5-8 for operating the gate control circuit 12 and reversible counter control circuit 15. In this way, inadequate operation of the system can be prevented.

The R-S flip-flop circuit constituted by the NAND circuits 1-7 and 1-8 in the self-timer control circuit 1 will now be discussed. As mentioned earlier, with the closure of the power supply it provides the 1 output $E_1$, thus giving 0 input to one of the input terminals of the NAND circuit 1-8, so that 1 output is provided therefrom. Meanwhile, since the other NAND circuit 1-7 receives 1 output of the NOR circuit 1-4 (to which the 0 output $F_1$ and another 0 output from the switch $SW_4$ are coupled), its output $E_2$ is 0. Since this signal $E_2$ is added to the NAND circuit 1-9 the NAND circuits 1-8 and 1-7 hold their respective 1 and 0 outputs even when the output $E_1$ becomes 0 after the lapse of a predetermined period.

When the output of the AND circuit 105 is inverted to 1 after the end of the self-timer period, the output of the NOR circuit 1-4 is inverted to 0, so that the output $E_2$ of the NAND circuit 1-7 is inverted from 0 to 1. Since this output $E_2$ is fed back to the NAND circuit 1-8 the output of the NAND circuit 1-8 is also inverted from 1 to 0. Thus, even when the signal coupled from the NOR circuit 1-4 to the NAND circuit 1-7 becomes 1 due to the inversion of the output of the AND circuit 105 to 0 with the resetting of the reversible counter 8 after the end of the self-timer period, the NAND circuit 1-7 holds its 1 output $E_2$ since the 0 output of NAND circuit 1-8 is added to its other input terminal. Further, at the time of the memorizing operation it is well possible to think that the outputs $Q_{10}$ and $Q_{13}$ of the tenth and thirteenth stages 8-10 and 8-13 of the reversible counter 8 both become 1. However, since one of the inputs to the NAND circuit 1-8 once inverted from 0 to 1 continues to hold its state, even with the inversion of one input to the NAND circuit 1-7, the output $E_2$ thereof continues to be 1, so that the output $E_3$ is held to ensure normal operation of the system.

Now, the case of the manual control with the use of the self-timer will be discussed. Like the case of the automatic control, the self-timer lever is set to the self-timer position prior to the start of taking a picture. Also, the movable contact piece 9-20M(to be described in connection with FIG. 3), which is movable by a auto-manual change-over ring, is moved to the manual position to ground one of terminals 9-1M, 9-2M, ..., 9-17M other than the control terminal 2-2.

At this time, the movable contact piece 9-20A coupled to the stop ring and film sensitivity ring may be at any position.

When the power source switch $SW_1$ is closed with the depression of the camera release button, 1 signal is given to the control line 2-1 since the control terminal 2-2 of the auto-manual transfer gate control circuit 2 is opened. Also, 0 signal is given to the self-timer control line 1-1 since the self-timer switch $SW_4$ is closed. Further, the reset pulse generator 3 consisting of the mono-stable multi-vibrator is actuated in synchronism to the closure of the power source switch and produces 1 output $E_1$ which is inverted to 0 after a predetermined period. The 1 output $E_1$ goes to the NOR circuit 1-12, which thus produces 0 signal as its output $R_1$ to reset the reversible counter 8. The output $E_1$ is also coupled through the inverter 1-9 to the R-S flip-flop constituted by the NAND circuits 1-7 and 1-8 to reset the same flip-flop.

As a result, the NAND circuit 1-7 produces 0 output $E_2$ while the NOR circuit 1-2 produces 1 output $E_3$, as in the previous case of the automatic control. Also, since the output $R_1$ is 0 when the output $E_1$ is 1 as mentioned earlier, the OR circuit 101 receiving the output of the inverter 1-13 produces 1 output $R_2$ to reset the frequency dividing circuit 7. The output $E_1$ is further coupled to the OR circuit 1-3. Since the other input terminal of the OR circuit 1-3 receives 0 signal from the self-timer control line 1-1, its output is coupled through AND circuit 4-9 and OR circuit 4-7 to give 1 output as signal $E_4$ to one input terminal of the NOR circuit 4-1. The output $E_3$ is also coupled to NOR circuits 5-1, 5-13, 10-1, 104 and 106, so that all these circuits provide 0 output. As a result, the transistors 5-2 and 5-3 of the brightness-time conversion circuit 5 become conductive, so that the capacitor 5-5 is not charged, permitting the switching circuit 5-6 to provide 0 output. The output $E_7$ of the NOR circuit 5-13 is coupled to the gate control circuit 12, so that the diode 12-1 becomes conductive to hold the capacitor 12-4 uncharged. Thus, the switching circuit 12-5 provides 0 output, and hence the switching circuit 15-4 provides 0 output. While the output of the switching circuit 15-4 is added to the NAND circuit 107, since the NAND circuit 107 receives at its other input terminal the output of the inverter 110 inverting the 1 signal on the control line 2-1, it provides 1 as its output T and 0 as its output T̄.

Since the 1 signal on the control line 2-1 does not change, the reversible counter 8 is held in the addition control mode irrespective of the level of the output of the switching circuit 15-4. Since the 0 output of the switching circuit 12-5 is coupled through the inverter 12-6 to the NOR circuit 15-9, the NOR circuit 15-9 provides 0 as its output $t$ and 1 as its output $\bar{t}$, thus giving an addition signal to the reversible counter 8. Further, the NOR circuit 104 produces 0 as its output $F_2$ added to the NOR circuit 4-1. Since the NOR circuit 106 receives the 1 signal on the control line 2-1 as well as the 1 output $E_3$, its output is 0 and does not change in the case of the manual control. The 1 output $E_3$ is further coupled to the NOR circuit 18-1, which thus provides 0 as its output $E_5$ coupled through the inverter 18-2 to the base of the transistor 18-3. Thus, the transistor 18-3 is off, permitting no current to the electromagnet $M_1$. Meanwhile, so long as the output $E_1$ is 1, the reversible counter is reset. Thus, the AND circuit 105 provides 0 output, and the NOR circuit 1-4 in the self-timer control circuit 1 provides 1 output. In consequence, with all 1 inputs, the NAND circuit 1-6 produces 0 output added to the base of the transistor 1-14, thus triggering the transistor 1-14 to energize the electromagent $M_2$.

Subsequently, when the output $E_1$ becomes 1 due to the restoring of the mono-stable multi-vibrator in the reset pulse generator 3, the output $R_1$ of the NOR circuit 1-12 becomes 1, thus releasing the reset state of the reversible counter 8. Also, the 1 signal $R_1$ goes through the inverter 1-13 to the OR circuit 101, thus inverting the output $R_2$ thereof to 0 to thereby release the reset state of the frequency dividing circuit 7. Simultaneously with the releasing of the reset state of the reversible counter 8 and frequency dividing circuit 7, the output of the OR circuit 1-3 is inverted to 0 to invert the outputs of the AND circuits 4-9 and OR circuit 4-7 to 9, thus rendering both inputs $E_4$ and $F_2$ to the NOR circuit 4-1 to 0, so that the standard pulse generator comprising the NOR circuit 4-1 and inverter 4-2 starts the generation of standard pulses.

Similar to the case of the automatic control, the standard pulse output of the inverter 4-3 is coupled through the AND circuit 10-4 and OR circuit 10-5 in the memory/call up transfer gate circuit 10 to the frequency dividing circuit 7. At this time, the NOR circuit 6 is off since it is fed with the 1 signal on the control line 2-1. The standard pulse input to the frequency dividing circuit 7 is frequency divided through the individual stages, and the output of the last stage 7-12 is coupled through the AND circuit 13-3 and OR circuit 13-4 in the auto/manual transfer gate circuit 13 to the reversible counter 8 for further frequency division there. As will be described later, the frequency divided standard pulse output is led through a conduction stage of one of the switching elements 17-1, 17-2, ..., in the second detecting circuit 17 corresponding to a selected control terminal selected in accordance with the preset manual control value to the AND circuit 14-3, which has its other input terminal connected to the control line 2-1, and whose output is coupled through the OR circuit 14-4 to the NOR circuit 18-1. However, since the NOR circuit 18-1 receives the 1 signal $E_3$ at its other input terminal, its output $E_5$ remains 0.

When the outputs $Q_{10}$ and $Q_{13}$ of the tenth and thirteenth stages 8-10 and 8-13 of the reversible counter 8 both become 1 in the course of the frequency division in the frequency dividing circuit 7 and reversible counter 8, that is, 9 seconds after the start of the oscillation, the output of the AND circuit 105 becomes 1, thus inverting the output of the NOR circuit 1-4 in the self-timer control circuit 1 to 0. Thus, like the case of the automatic control, the output $E_2$ of the NAND circuit 1-7 is inverted to 1 to invert the output $E_3$ of the NOR circuit 1-2 to 9. Also, similar to the case of the automatic control, with the inversion of the output $Q_{13}$ to 1 after the lapse of 8 seconds from the start of the oscillation the output of the NAND circuit 19-1, which receives the 1 output $E_3$ at one of its input terminals, is inverted to 0 to trigger the transistor 19-2, thus rendering the light-emitting diode 19-3 luminant. With the inversion of the output $E_3$ from 1 to 0 the luminescent diode ceases to glow, thus forecasting the end of the self-timer operation.

With the inversion of the output $E_3$, the output of the AND circuit 4-9 in the standard pulse generator 4 is inverted to 0, Meanwhile, in the case of the manual control, the signal on the control line 2-1 is coupled through the inverter 19 as 0 input to the AND circuit 4-13, with the outputs of the AND circuits 4-12 and 4-13 going to the OR circuit 4-11, whose output is added as one of the inputs to the AND circuit 4-8. Also, the AND circuit 4-12 receives at its one input terminal 0 signal from the inverter 4-14 and at its other input terminal the 1 output of the inverter 20-2 in the delay circuit 20, so that it provides 1 output coupled through the OR circuit 4-11 to the AND circuit 4-8. Thus, with the inversion of the output $E_3$ from 1 to 0, the AND circuit 4-8 provides 1 output since it receives at its other input terminal the 1 output of the inverter 4-10, this 1 signal being coupled through the OR circuit 4-7 as input $E_4$ to the NOR circuit 4-1, to thereby stop the standard pulse generation.

Further, with the inversion of the output $E_3$ from 1 to 9 the manual control period is indicated in a manner similar to the case of the automatic control. At the same time, the mono-stable multi-vibrator consisting of the NOR circuit 1-10 and inverter 1-11 is triggered so that the inverter 1-11 provides 1 output for a short period. With this 1 output the output $R_1$ of the NOR circuit 1-12 is inverted to 0 to reset the reversible counter 8 while also resetting the frequency dividing circuit 7 through the inverter 1-13. At this time, the output $E_7$ is also inverted as will be described layer, thus triggering the monostable multi-vibrator consisting of the NOR circuit 103 and inverter 102 which thus 1 output for a short time. At any rate, the output $R_2$ of the OR circuit 101 is inverted to 1. The reason why the output $E_7$ of the NOR circuit 5-13 in the brightness-tome conversion circuit 5 is inverted to 1 with the inversion of the output $E_3$ will now be discussed.

This is because the outputs of both AND circuits 5-9 and 5-11 are 0 to let the output of the OR circuit 5-12 be 0, since the AND circuit 5-11 receiving the 1 signal from the control line 2-1 has its other input terminal grounded. With the inversion of the output $E_7$ to 1, the capacitor 12-4 in the gate control circuit 12 starts to be charged, and after the lapse of a predetermined period, the output of the switching circuit 12-5 is inverted from 0 to 1. While with this invention the mono-stable multi-vibrator consisting of the switching circuit 15-4, NOR circuit 15-6 and inverter 15-7 in the reversible counter control circuit 15 is actuated, the addition control mode of the reversible counter 8 is not altered as mentioned earlier. Meanwhile, the output $E_8$ of the NOR circuit 10-1 in the memory/call up transfer gate circuit 10 is 0 so long as the output $E_3$ is 1, and it is rendered 1 for a short period from the inversion of the output $E_3$ to 0 till the inversion of the output of the switching circuit 12-5 to 1 and is then inverted to 0 again with the inversion of the output of the switching circuit 12-5 to 1. Thus, the AND circuit 10-2 is rendered on for a short period and is otherwise "off". Thus, the AND circuit 10-4 and OR circuit 10-5 form the signal path.

With the inversion of the output $E_3$ the output $E_5$ of the NOR circuit 18-1 in the shutter control circuit 18 is inverted to 1 to trigger the transistor 18-3, thus energizing the electromagnet $M_1$. At this time, 0 signal prevails on the detection line 17-20 since both the frequency dividing circuit 7 and reversible counter 8 are reset, while the output of the AND circuit 14-3 and OR circuit 14-4 are 0. Also, with the inversion of the input $E_3$ to the NOR circuit 104 from 1 to 0, the output $E_5$ of the NOR circuit 18-1 in inverted from 0 to 1, so that the output $F_2$ of the NOR circuit 104 is held 0. With the 1 -to-0 inversion of the output $E_6$ of the inverter 12-6 in the gate control circuit 12, which output is added to the NAND circuit 1-6 in the self-timer control circuit 1, the output of the NAND circuit 1-6 is inverted to 1 to cut off the transistor 1-14, thus de-energizing the electromagnet $M_2$. With the de-energization of the electromagnet $M_2$, the engagement of the mirror lock pawl and mirror drive member is released, causing the mirror drive member to raise the mirror, with the front screen locking pawl being released, upon reaching of the upper set position of the mirror, to start the run of the front screen while opening the timing switch $SW_3$ similar to the case of the automatic control. With the opening of the timing switch $SW_3$ the capacitor 20-4 starts to be charged, and after the lapse of a predetermined period the output of the swiching circuit 20-1 is inverted from 0 to 1. As a result, the output of the inverter 20-2 becomes 0 to turn off the light-emitting diode which had theretofore been indicating the manual control period. At the same time, the outputs of the AND circuit 4-12 and OR circuit 4-1 are inverted to 0 to invert the input $E_4$ to the NOR circuit 4-1 to 0, whereupon the standard pulse generation is resumed. The standard pulse output thus provided is coupled through the AND circuit 10-4 and OR circuit 10-5 in the memory/call up transfer gate circuit 10 to the frequency dividing circuit 7. The standard pulse input to the frequency dividing circuit 7 is coupled through all the stages of the frequency dividing circuit 7 for frequency division and then coupled through the AND circuit 13-3 and OR circuit 13-4 in the auto/manual transfer gate circuit 13 to the reversible counter 8 for further frequency division.

At this time the frequency divided standard pulse signal is led through a switching element having the gate terminal thereof connected to a grounded control terminal selected from the control terminal group in the signal line select circuit 9 to the manual detection line 17-20. The selection of the control terminal is made according to the preset manual control value. For example, when the control terminal 9-2 is selected, the associated switching element 17-1 is rendered conductive, so that the standard pulse input is frequency divided through 12 stages. Thus, if the standard pulse oscillation is set to 2.048 MHz, the inversion of the output of the twelfth stage 7-12 of the frequency dividing circuit 7 takes place 1/1,000 second after the start of the standard pulse generation. When the control terminal 9-5 is selected, the associated switching element 17-5 is rendered conductive, and the frequency divided standard pulse signal is sent forth to the manual detection line 17-20 after the lapse of 1/128 second. When the control terminal 9-13 is selected, the corresponding switching element 17-13 is rendered conductive, and the frequency divided standard signal is sent forth after the lapse of 2 seconds. It will be seen that the exposure time is controlled to 1/1,000 second by selecting the terminal 9-2, 1/128 second by selecting the terminal 9-5, and 2 seconds by selecting the terminal 9-13.

With the appearance of 1 signal on the manual detection line 17-20, the output of the AND circuit 14-3 receiving this 1 signal is inverted to 1. This 1 output is coupled through the OR circuit 14-4 to the NOR circuit 18-1, so that the output $E_5$ of the NOR circuit 18-1 is inverted to 0. Since this output is coupled through the inverter 18-2 to the transistor 18-3, the transistor 18-3 is cut off to de-energize the electromagnet $M_1$, causing the run of the rear screen to be started to end the exposure.

Meanwhile, with the inversion of the output $E_5$ of the NOR circuit 18-1, the NOR circuit 104 receives 0 signal, so that is output $F_2$ is inverted to 1 to provide 1 input to the NOR circuit 4-1 in the standard pulse generator circuit 4, thus stopping the standard pulse generation.

The case of the automatic control without use of the self-timer will now be discussed, Unless the self-timer is used, the self-timer switch $SW_4$ is held open. Also, the terminal 2-2 of the auto/manual transfer circuit is grounded. With depression of the camera release button the power source switch $SW_1$ is closed, so that 1 signal appears on the self-timer control line 1-1 and 0 signal on the control line 2-1.

Thus, the electromagnet $M_2$ is not energized. Simultaneously with the closure of the power source switch, a reset pulse is produced from the reset pulse generator circuit 3, inverting the output $R_1$ of the NOR circuit 1-12 in the self-timer control circuit 1 to 0 to reset the reversible counter 8 while resetting the frequency dividing circuit 7 through the inverter 1-13 and the OR circuit 101. Meanwhile, the output $E_3$ of the NOR circuit 1-2 is held 0 irrespective of the output $E_2$ of the NAND circuit 1-7 since the 1 signal on the self-timer control line 1-1 prevails as input at one input terminal of the NOR circuit 1-2. With the 1 signal $E_1$ coupled through the NOR circuit 1-12 and inverter 1-13 to the NOR circuit 5-1 in the brightness-time conversion circuit 5, the NOR circuit 5-1 provides 0 output. Consequently, the transistors 5-2 and 5-3 are made conductive, and the output of the switching circuit 5-6 is 0. Since the NOR circuit 5-8 receives this 0 signal together with 0 signal from the inverter 5-7 inverting the output of the delay circuit 20, the output of the NOR circuit 5-8 is 1. This 1 signal goes through the AND circuit 5-9 and OR circuit 5-12 to the NOR circuit 5-13, so that the output $E_7$ thereof is 0.

In consequence, the output of the switching circuit 12-5 is 0, and the output $E_6$ of the inverter 12-6 is 1. Likewise, the output of the switching circuit 15-4 is 0, so that the outputs T and $\overline{T}$ of the NAND circuit 107 are respectively 1 and 0. The NOR circuit 10-1 in the memory/call up transfer gate circuit 10 receives the 0 signal $E_3$ and the 0 output of the switching circuit 12-5, so that its output is 1, holding the AND circuit 10-4 off. Consequently, the signal path is formed by the AND circuit 10-2 and OR circuit 10-5. Meanwhile, the NOR circuit 106, which receives the output $E_3$ and the signal on the control line 2-1, provides 1 as its output $E_9$, holding the AND circuit 13-3 in the auto/manual transfer gate circuit 13 off. Consequently, the signal path is formed by the AND circuit 13-2 and OR circuit 13-4. The NOR circuit 18-1 in the shutter control circuit 18 provides 1 as its output $E_5$ since it receives the signal $E_3$ at its one input terminal and 0 signal at its other input terminal. This 1 output is provided through the inverter 18-2 to the transistor 18-3, so that the transistor 18-3 is rendered conductive to energize the electromagnet $M_1$. Since the NOR circuit 104 receives the 1 output $E_5$ of the NOR circuit 18-1, its output $F_2$ is 0, providing 0 input to the NOR circuit 4-1 in the standard pulse generator circuit 4. The AND circuit 4-16 in the standard pulse generator circuit 4 receives at its one input terminal the 1 signal $E_6$, while the 1 signal $E_6$ is coupled through the NOR circuit 1-12 and inverter 1-13 as 1 input to the other input terminal of the AND circuit 4-16. Thus, the AND circuit 4-16 provides 1 output coupled through the OR circuit 4-15 to the AND circuit 4-13. The AND circuit 4-13 receives at its other input terminal the output of the inverter 4-19 inverting the signal on the control line 2-1, so that it provides 1 output coupled through the OR circuit 4-11, AND circuit 4-8 and OR circuit 4-7 as 1 input $E_4$ to the NOR circuit 4-1. Consequently, no standard pulse is generated.

With the subsequent restoring of the mono-stable multi-vibrator in the reset pulse generator circuit 3, the output $E_1$ thereof is inverted to 0. This 0 signal is coupled through the NOR circuit 1-12 and inverter 1-13 as 0 input to the AND circuit 4-16, while it is also coupled through the OR circuit 4-15 as 0 input $E_4$ to the NOR circuit 4-1. As a result, the reference pulse generator comprising the NOR circuit 4-1 and inverter 4-2 starts to generate standard pulses. Simultaneously, the NOR circuit 5-1 in the brightness-time conversion circuit 5, receiving the 0 output of the inverter 1-13, produces 1 output to cut off the transistors 5-2 and 5-3 to start the charging of the capacitor 5-5. The standard pulse output is coupled through the NOR circuit 6, AND circuit 10-2 and OR circuit 10-5 to the frequency dividing circuit 7 and signal line select circuit 9. More particularly, it is coupled through the switching element 9-23 or switching element 9-24 and a line leading from a selected control terminal to the gate between corresponding adjacent stages of the reversible counter 8 or directly to the reversible counter 8 or, after frequency division, through the stages 7-1, 7-2, ..., 7-12 to the reversible counter 8 for additive storing there in the manner as described earlier in connection with the case of the automatic control with the use of the self-timer.

When the capacitor 5-5 in the brightness-time conversion circuit 5 is charged to a predetermined terminal voltage, the output of the switching circuit 5-6 is inverted from 0 to 1 to invert the output of the NOR circuit 5-8 to 0. With this 0 output coupled through the AND circuit 5-9 and OR circuit 5-12 to the NOR circuit 5-13, the output $E_7$ thereof is inverted to 1 to cut off the NOR circuit 6, thus ending the memorization. The memory value stored in the reversible counter 8 is indicated as a corresponding shutter speed within the finder by the shutter speed indicator. Meanwhile, upon inversion of the output $E_7$ of the NOR circuit 5-13 to 1 the capacitor 12-4 in the gate control circuit 12 starts to be charged, and after the lapse of a predetermined period the output of the switching circuit 12-5 is inverted to 1 to invert the output $E_6$ of the inverter 12-6 to 0. With the inversion of the output $E_6$ to 0 the output of the AND circuit 4-16 is inverted to 0, while the output of the AND circuit 4-17 is inverted to 1. At the same time, the AND gate 11-3 in the memory/call up transfer gate circuit 11 is cut off, while the AND circuit 11-2 is rendered conductive. With the inversion of the output of the switching circuit 12-5 to 1, the output of the NOR circuit 10-1 is inverted to 0 to cut off the AND circuit 10-2 while rendering the AND circuit 10-3 conductive. Also, with the inversion of the output of the switching circuit 12-5, the mono-stable multi-vibrator consisting of the NOR circuit 15-6 and inverter 15-7 is triggered, whereby after the outputs $t$ and $\overline{t}$ are respectively rendered 1 and 0 for a constant period, t and t are respectively rendered 0 and 1. During this period, the output of the switching circuit 15-4 is inverted from 0 to 1 to invert the output T of the NAND circuit 107 from 1 to 0 and the output $\overline{T}$ from 0 to 1, thereby switching the reversible counter 8 from the addition control mode over to the subtraction control mode.

The operation so far takes place during the camera release depression stroke. Accordingly, the ratio between the memorization time and exposure time is set to be at least 1 : 50. At the end of the release depression stroke, the release plate is locked by the lock lever while acting upon the mirror lock pawl to release the engagement of the mirror lock pawl and mirror drive member. The mirror thus released starts to rise, and upon reaching of the upper set position of the mirror, the front screen is released from engagement with the front screen lock pawl and starts to run. Substantially at the same time as the start of the run of the front screen, the timing switch $SW_3$ is opened by the front screen drive member. Upon opening of the timing switch $SW_3$ the capacitor 20-4 starts to be charged, and after the lapse of a predetermined period the output of the switching circuit 20-1 is inverted from 0 to 1, thereby inverting the output of the inverter 20-2 from 1 to 0. As a result, the shutter speed indicator is reset, while at the same time the AND circuit 4-17 produces 0 output coupled through the OR circuit 4-15 and AND circuit 4-13 as 0 input $E_4$ to the NOR circuit 4-1, thus causing the resumption of the standard pulse generation. The standard pulse output thus produced is coupled through the AND circuit 10-4 and OR circuit 10-5 to the frequency dividing circuit 7. At this time, the NAND circuit 9-21 is off with 0 signal as its one input.

The standard pulse input to the frequency dividing circuit 7 is frequency divided through its states 7-1, 7-2, ..., 7-8 and then coupled through AND circuit 11-2, OR circuit 11-5, AND circuit 13-2 and OR circuit 13-4 to the reversible counter 8 for subtraction from the memorized value. When the memorized value becomes zero, the individual stage outputs $\overline{Q}_1, \overline{Q}_2, ..., \overline{Q}_{18}$ of the reversible counter 8 all become 1, so that all the switching elements 16-1, 16-2, ..., 16-8 are cut off to provide 1 signal appearing on the automatic detection line 16-20. With this 1 signal the output of the AND circuit 16-21 which also receives the output $\overline{T}$ which is already 1, is inverted to 1. With this 1 signal coupled through the AND circuit 14-1 and OR circuit 14-4 to the NOR circuit 18-1, the output $E_5$ thereof is inverted to 0, thus triggering the transistor 18-3 to de-energize the electromagnet $M_1$. Upon de-energization of the electromagnet $M_1$ the rear screen is released to end the exposure. Meanwhile, the 0 output $E_5$ of the NOR circuit 18-1 enters the NOR circuit 104 to invert the output $F_2$ thereof to 1 which is then added as an input to the NOR circuit 4-1, thus stopping the standard pulse generation.

At this time, if the timing switch $SW_3$ is opened with the depression of the camera release button before the memorization of the subject brightness is memorized in the case where the brightness of the subject is low, the control signal for memorization will continue to be provided by the gate control circuit 12 and reversible counter control circuit 15 since the output of the switching circuit 5-6 in the brightness-time conversion circuit 5 is not inverted from 0 to 1. Under the command of such control signal the exposure time is subject to a great error. According to the invention, the output signal of the delay circuit 20 which is inverted from 0 to 1 upon opening of the timing switch $SW_3$ is coupled through inverters 20-2 and 5-7 to the NOR circuit 5-8 so as to produce from the NOR circuit 5-8 a signal providing for an equivalent effect to that resulting from the inversion of the output of the switching circuit 5-6. By such an arrangement, the gate control circuit 12 and reversible counter control circuit 15 can be actuated whenever the timing switch $SW_3$ is opened even if the output of the switching circuit 5-6 in the brightness-time conversion circuit 5 is not inverted from 0 to 1, thereby preventing, a large error of the exposure time.

Finally, the case of the manual control without use of the self-timer will be discussed.

Without the use of the self-timer, the signal on the self-timer control line 1-1 is 1, and the signal on the control line 2-1 is also 1, so that the NAND circuit 1-6 provides 1 output. Thus, the transistor 1-14 is off, and the electromagnet $M_2$ is not energized. Since the NOR circuit 6 receives the 1 signal on the control line 2-1, it is off. The NOR circuit receives the signal on the self-timer control line 1-1, so that its output $E_3$ is 0. Thus, the output $E_7$ of the NOR circuit 51-31, which receives the output $E_3$ at its one input terminal and 0 signal at its other input terminal, is 1. Also, since the signal on the control line 2-1 goes to the NOR circuit 106, its output $E_9$ is 0. Thus, the AND circuit 13-2 of the auto/manual transfer gate circuit 13 is off, while the AND circuit 13-3 is conductive.

With the depression of the camera release button the power source switch $SW_1$ is closed, while at the same time the reset pluse generator 3 produces a reset pulse coupled through the NOR circuit 1-12 to the reversible counter 8 to reset the same and also coupled through the inverter 1-13 and OR circuit 101 to the frequency dividing circuit 7 to reset the same. At this time, the output $E_7$ of the NOR circuit 5-13 in the brightness-time conversion circuit 5 is 1 as mentioned earlier so that a short period after the closure of the power source switch $SW_1$ the output of the switching circuit 12-5 in the gate control circuit 12 is inverted to 1 to trigger the monostable multi-vibrator in the reversible counter control circuit 15. However, since the outputs T and $\overline{T}$ are held respectively at 1 and 0, the reversible counter 8 is in the addition control mode.

With further depression of the camera release button the exposure is started, while opening the timing switch $SW_3$, and after the lapse of a predetermined period the output of the switching circuit 20-1 is inverted to 1 to invert the output of the inverter 20-2 to 0, which is coupled through the AND circuit 4-17 and OR circuit 4-15 as 0 input $E_4$ to the NOR circuit 4-1 to start the standard pulse generation. The standard pulse output is coupled through the AND circuit 10-4 and OR circuit 10-5 to the frequency dividing circuit 7 for frequency division through all the stages and then coupled through the AND circuit 13-3 and OR circuit 13-4 in the auto/manual transfer gate circuit 13 to the reversible counter for further frequency division. At this time, all other pulse paths are shut off.

As has been mentioned earlier, in the manual control mode, a control terminal in the signal line select circuit 9 is selected according to the present manual control value. If the manual control value is, for instance, 1/1,000 second, the standard pulse input to the frequency divider 7 is frequency divided through the stages 7-1, 7-2, ..., 7-12, and 1/1,000 second after the start of oscillation the resultant 1 output is led through the corresponding "on" switching element 17-1 to the manual detection line 17-20. This 1 signal is coupled through the AND circuit 14-3 and OR circuit 14-4 to the NOR circuit 18-1 to invert the output thereof to 1, whereupon the inverter 18-2 provides output 1 to the base of the transistor 18-3 to cut off the transistor 18-3, thus denergizing the electromagnet $M_1$ to end the exposure in the manner as mentioned earlier. Meanwhile, since the 0 output of the NOR circuit 18-1 is added to the NOR circuit 104, the output $F_2$ thereof is inverted to 1, giving 1 input to the NOR circuit 4-1 to stop the standard pulse generation.

Figure 3:
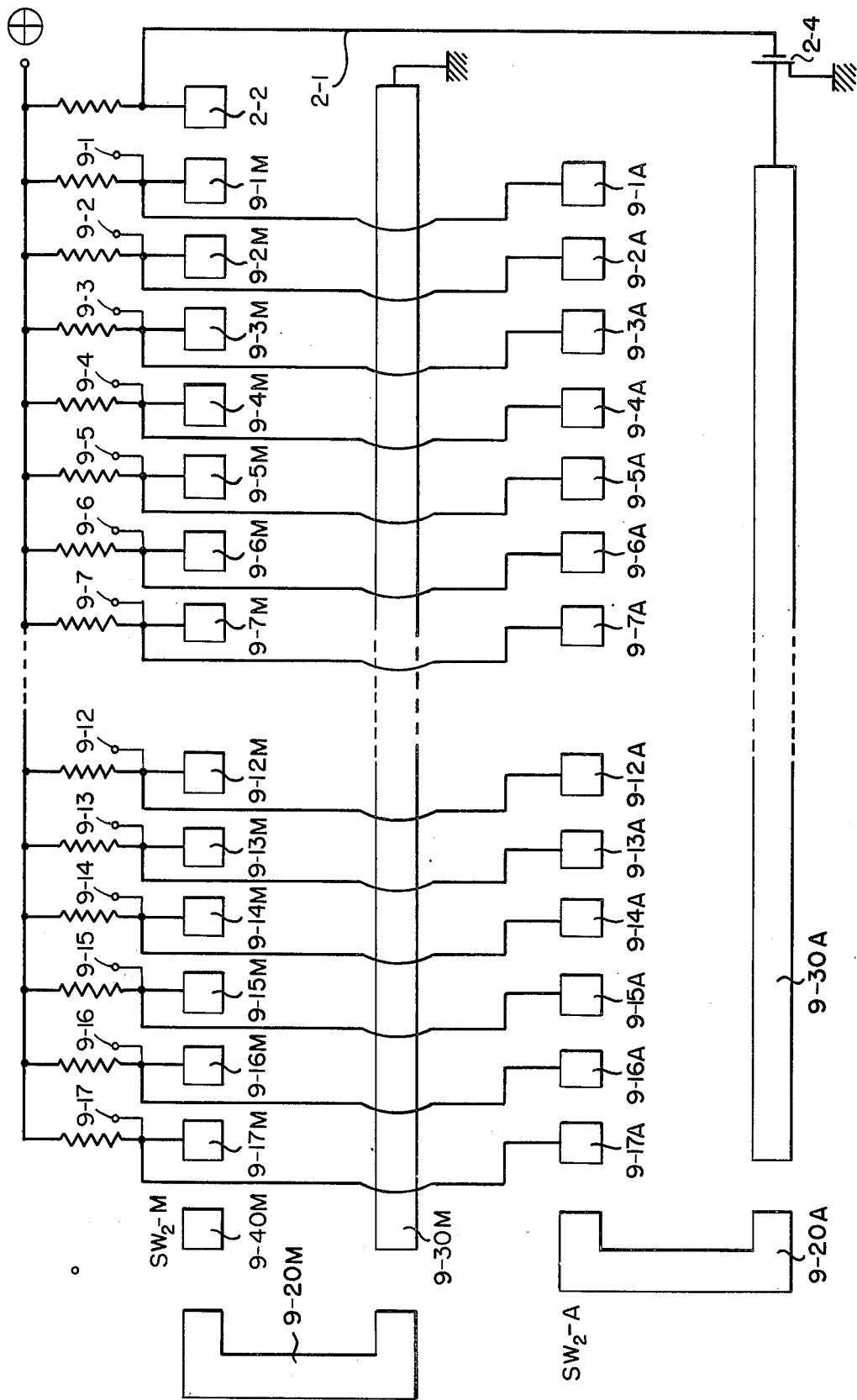
FIG. 3 is a schematic diagram showing a select switch used in the FIG. 1 construction.

FIG. 3 shows the select switch $SW_2$ for selecting the control terminals 9-1, 9-2, ..., 9-17 in the signal line select circuit 9. A select switch $SW_2$-A is provided for introducing the exposure time determination factor other than the subject brightness, while a select switch $SW_2$-M is provided for determining the exposure time in the case of the manual control. This select switch $SW_2$ will now be described by also having reference to FIG. 2.

The select switch $SW_2$-A comprises a common contact piece 9-30A, a movable contact piece 9-20A and terminals 9-1A, 9-2A, ..., 9-17A. As has already mentioned in connection with FIG. 2, the movable contact piece 9-20A is moved by a drive member coupled to both the stop ring and film sensitivity setter ring provided in the camera unit. The select switch $SW_2$-M comprises a common contact piece 9-30M, a movable contact piece 9-20M and terminals 9-1M, 9-2M, ..., 9-17M. As is shown, the terminal 9-1A is short-circuited to the terminal 9-1M, the terminal 9-2A to the terminal 9-2M, and so forth. Further, the terminals 9-1A, 9-2A, ..., 9-17A are connected to the respective control terminals 9-1, 9-2, ..., 9-17 in the signal line select circuit 9 shown in FIG. 2. The select switch $SW_2$-M is further provided with the terminal 2-2, and for the automatic control of the exposure time the movable contact piece 9-20M is brought to the terminal 2-2 by the auto/manual changeover ring as mentioned earlier in connection with FIG. 2.

When the movable contact piece 9-20M short-circuits the common contact piece 9-30M to the terminal 2-2, 0 signal is given to the control line 2-1, whereby the P-channel field-effect transistor 2-4 (hereinafter referred to as FET) is triggered to render 0 the potential on the common contact piece 9-30A of the select switch $SW_2$-A. As a result, the potential on the terminal short-circuited through the movable contact piece 9-20A to the common contact piece 9-30A of the select switch $SW_2$-A is also rendered 0 to render 0 the potential on the corresponding control terminal. At this time, the signal on the control line 2-1 is 0, so that each circuit is operative on the basis of the automatic control, so that the exposure time determination factor other than the subject brightness, for instance information about film sensitivity or diaphragm, may be introduced by suitably switching the movable contact piece 9-20A of the select switch $SW_2$-A.

It is now assumed that the movable contact piece 9-20A of the select $SW_2$-A is moved to the terminal 9-5A. If this position corresponds to ASA 100 with F 11, and if eight standard pulses are permitted through the NOR circuit 6 and the switching element 9-23 during the presence of the pulse provided from the brightness-time conversion circuit 5, eight pulses are added to the reversible counter 8, so that the output $Q_4$ of the fourth stage 8-4 is inverted. If the afore-said position corresponds to ASA 100 with F 16, with the short-circuiting of the terminal 9-4A through the movable contact piece 9-20A to the common contact piece 9-30A, eight standard pulses produced from the standard pulse generator 4 goes through the NAND circuit 9-21 and NOR circuit 9-25 to the gate 8-1' between the first and second stages 8-1 and 8-2 of the reversible counter 8, and the output of the fifth stage 8-5 is inverted. This is equivalent in effect to what results when sixteen pulses are coupled to the reversible counter 8.

Also, if in the case of setting to ASA 100 with F 11 the terminal 9-6A is short-circuited through the movable contact piece 9-20A to the common contact piece 9-30A to provide 0 to appear on the control terminal 9-6, with eight standard pulses from the standard generator 4 frequency divided in the first stage 7-1 of the frequency dividing circuit 7 and then led through the switching element 9-26 and also through the memory/-call up transfer gate circuit 11 and auto/manual transfer gate circuit 13 to the reversible counter 8 the output of the third stage 8-3 is inverted to memorize four pulses. If the substraction from the memorized value obtained in this way is made by using a pulse signal at a constant frequency with the same subject brightness the exposure time that results when the terminals 9-4A, 9-3A, 9-2A, ... are short-circuited can be made respectively 2, 4, 8, ..., times the exposure time that results when the terminal 9-5A is selected, while when the terminals 9-6A, 9-7A, ..., are short-circuited it can be made respectively 1/2, 1/4, ..., time that in case when the terminal 9-5A is selected. In this way, by suitably switching the select switch $SW_2$-A it is possible to introduce the film sensitivity or diaphragm information in the exponential system based on 2.

When the movable contact piece 9-20M of the select switch $SW_2$-M is switched from the terminal 2-2 to another terminal, the signal on the control terminal 2-1 is inverted to 1 to cut off the FET 2-4, thus rendering all the circuits into the manual control mode while rendering 1 the potential on the common contact piece 9-30A. Now, if the potential on the terminal 9-2M of the select switch $SW_2$-M is rendered 0, the standard pulse output of the standard pulse generator 4 is progressively frequency divided through the stages 7-1, 7-2, ..., 7-11 of the frequency dividing circuit 7 in the manner as mentioned earlier, with the output of the stage 7-12 being inverted and led through the switching element 17-1 in the second detecting circuit 17 to the manual detection line 17-20, whereby the exposure time is controlled.

Now, the case when the terminal 9-40M is short-circuited through the movable contact piece 9-20M to the common contact piece 9-40M will be discussed by also having reference to FIG. 2. The terminal 9-40M is provided for bulb photographing. For instance, it is so arranged that the lock lever for locking the release plate as mentioned in connection with FIG. 2 is not actuated when the movable contact piece 9-20M is switched to the terminal 9-40M. Since the terminal 9-40M is not connected to any control terminal as shown in FIG. 3, at this time all the control terminal 9-1, 9-2, ..., 9-17 provide output 1 to render all the switching elements 17-1, 17-2, ..., 17-17 in the second detecting circuit 17 off, while the signal on the manual detection line 17-20 is 0 due to the resistor 112. Thus, in the case of the manual control as mentioned above, so long as the power source switch $SW_1$ is on the output $E_5$ of the NOR circuit 18-1 in the shutter control circuit 18 will not become 0, and the electromagnet $M_1$ is held activated. With the subsequent opening of the power source switch $SW_1$, the electromagnet $M_1$ is de-energized to end the exposure. In this way, by setting the movable contact piece 9-20M to the terminal 9-40M the bulb operation can be effected.

Figure 4:
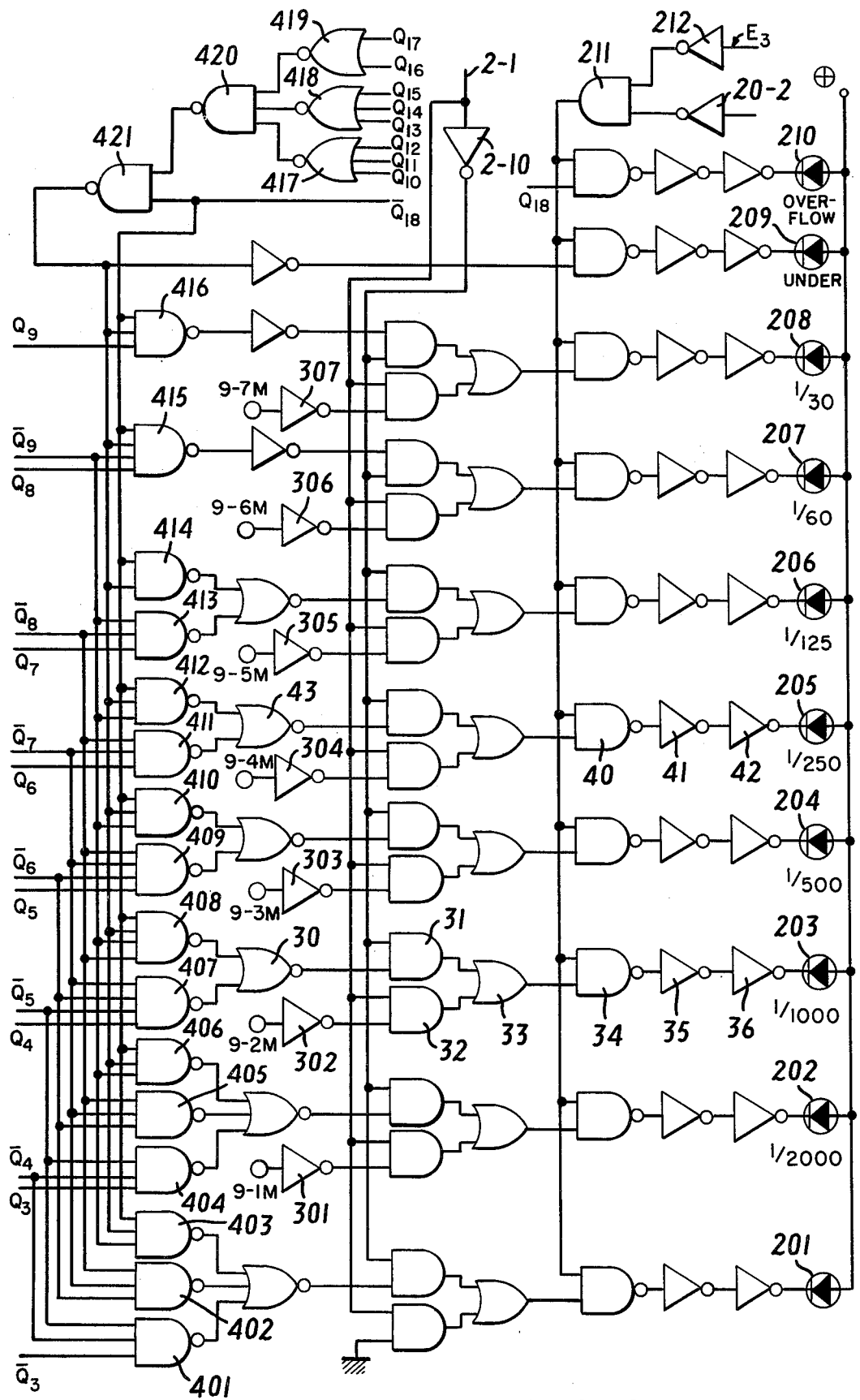
FIG. 4 is a schematic diagram showing a shutter speed indicator used in the FIG. 1 construuction.

FIG. 4 shows an example of the shutter speed indicator 21. Referring to the Figure and also to FIG. 2, the outputs $Q_3$, $\overline{Q_3}$, $Q_4$, $\overline{Q_4}$ ..., $Q_{18}$, $\overline{Q_{18}}$ of the third to eighteenth stages of the reversible counter 8 are respectively connected to NAND circuits 401, 402, ..., 416 and NOR circuits 417, 418 and 419 in the illustrated way.

Light-emitting diodes 201, 202, ..., 210 are disposed, for instance, within the finder. They serve to indicate the shutter speed or various information about exposure (such as over-exposure alarm, under-exposure alarm and over-flow alarm) to the camera user in accordance with the memorized value in the reversible counter 8. They are operated according to the memory content of the reversible counter 8, the signal on the control line 2-1 in the auto/manual transfer gate circuit 2, the output $E_3$ of the NOR circuit 1-2 in the selftimer control circuit 1 and the output signal of the inverter 20-2 in the delay circuit 20 actuated upon closure of the timing switch. (The following description is concerned only with the case of turning on the light-emitting diodes 203 and 205 for the sake of simplifying the description.)

The case of the automatic control with the use of the self-timer will first be discussed. In this case, the output $E_3$ is 1 during the operative period of the self-timer. Since this output is coupled through the inverter 212 to the AND circuit 211, the output thereof is 0. Thus, NAND circuits 34 and 40 provide 1 output, and hence inverters 36 and 42 provide 1 output. Consequently, the light-emitting diodes 203 and 205 are off. Of course at this time the timing switch $SW_3$ is closed, so that the output of the inverter 20-2 in the delay circuit 20 is 1. Also, because of the automatic control, the signal on the control line 2-1 is 0, with AND circuits 32 and 38 providing 0 output and with a 1 signal being coupled from the inverter 2-10 to the AND circuits 31 and 37. Upon inversion of the output $E_3$ to 0 at the end of the self-timer operation, 1 output is provided from an AND circuit 211, and it is added to the NAND circuits 34 and 40. If at this time eight pulses are memorized in the reversible counter, 1/1,000 second is obtained as the exposure time. Also, the output $Q_4$ of the fourth stage 8-4 becomes 1, so that all the inputs to the NAND circuit 407 becomes 1. Consequently, the NAND circuit 407 provides 0 output. Meanwhile, all the inputs to the NAND circuit 408 are 1, so that the output thereof is 0.

Thus, the NOR circuit 30 receiving the outputs of both these NAND circuits provides 1 output added to the AND circuit 31. Since the AND circuit 31 receives the 1 signal at its other input terminal as mentioned above, it provides 1 output coupled through the OR circuit 33 to the NAND circuit 34. The NAND circuit 34 receives 1 signal at its other input terminal as mentioned above, so that it provides 0 output coupled through the inverters 35 and 36. Thus, the inverter 36 provides 0, thereby lighting light emitting diode 203 and displaying 1/1000 second shutter speed. And also, if thirty-two pulses are given as inputs to reversible counter 8, the time obtainable for exposure is 1/250 second, then the output $Q_6$ of counting stage 8-6 for reversible counter 8 comes to be 1, and since all other inputs of NAND circuit 411 and NAND circuit 412 are 1, those outputs become 0 and the output of NOR circuit 43 becomes 1, which allows one input end of NAND circuit 40 to be 1 through AND circuit 37, OR circuit 39. As mentioned above, other input end is given 1 signal, and hence, the output of NAND circuit 40 comes to be 0, thus making light emitting diode 205 light for display of 1/250 second through inverters 41 and 42 Next, an explanation is given to the case of manual setting in which self-timer is employed. Similarly as mentioned above, during actuation of the self-timer or while E3 is 1, light emitting diodes 201, 202-210 are not to be lighted, and at the same time, when E3 becomes 0, the light emitting diode for indicating the manual-set value selected is lighted. In case of manual setting, 1 signal is delivered to control line 2-1, and therefore, the outputs of AND circuits 31 and 37 come to be 0, and 1 signal on the control line 2-1 is given to one input terminal of AND circuits 32, 38 and the outputs of inverters 302, 304 are delivered to the other input terminals. The input terminals of the inverters 301, 302, ..., 307 are connected to the respective terminals 9-1M, 9-2M, ..., 9-7M of the auto/manual select switch $SW_2$ shown in FIG. 3. Thus, if the shutter speed is set to 1/1,000 second, the terminal 9-2M is shortcircuited by the movable contact piece 9-20M of the auto/manual select switch $SW_2$, rendering the potential on the terminal 9-2M to 0 to invert the output of the inverter 302 to 1 and the output of the AND circuit 32 to 1. The 1 output of the AND circuit 32 is coupled through the OR circuit 33 to the NAND circuit 34 to invert the output thereof to 0.

This 0 output is coupled through the inverters 35 and 36 to the light-emitting diode 203 to turn on the same. If the shutter speed is set to 1/250 second, the terminal 9-4M is short-circuited to provide 0 output, so that the output of the inverter 304 is inverted to 1 to invert the output of the AND circuit 38 to 1 . This 1 signal goes through the OR circuit 39 to the NAND circuit 40, whose output is coupled through the inverters 41 and 42 to the light-emitting diode 205 to turn on the same.

In the case of the automatic control without the use of the self-timer, upon closure of the power source switch $SW_1$ the output $E_3$ becomes 0, so that the output of the AND circuit 211 also becomes 1.

Also, the memorizing operation takes place with the closure of the power source switch $SW_1$. Thus, similar to the afore-mentioned case, with the memorization of, for instance, eight pulses in the reversible counter 8, the output $Q_4$ becomes 1 to render the output of the NAND circuit 407 0, so that the NOR circuit 30 produces 1 output coupled through the AND circuit 31 and OR circuit 33 to the NAND circuit 34 to invert the output thereof to 0, thus turning on the light-emitting diode 203 to indicate 1/1,000 second.

In the case of the manual control without the use of the self-timer, upon closure of the power source switch $SW_1$ the output $E_3$ becomes 0 to render the output of the AND circuit 211 1. Also, 1 signal is given to the control line 2-1.

If the preset manual control value is, for instance, 1/1,000 second, 0 signal is added to the input terminal of the inverter 302, and its 1 output is coupled through the AND circuit 32 and OR circuit 33 to the NAND circuit 34 to invert the output thereof to 0. With this 0 signal coupled through the inverters 35 and 36 to the light-emitting diode 203, the diode 203 is turned on to indicate the shutter speed of 1/1,000. It is to be noted here that in the case of the manual control, a preset manual control value less than 1/15 second is not indicated.

The shutter speed is indicated within a period until the opening of the timing switch $SW_3$, and with the inversion of the output of the switching circuit 20-1 to 1 after the opening of the timing switch $SW_3$ the output of the inverter 20-2 is inverted to 0 to invert the output of the AND circuit 211 to 0. If one input to, for instance, the NAND circuit 40 is 1, with the inversion of the inverter 20-2 to 0 after the opening of the timing switch $SW_3$, the output of the AND circuit 211 is inverted to 0 to invert the output of the NAND circuit 40 to 1. This 1 output is coupled through the inverter 41 to the inverter 42, which thus provides 1 output to turn off the light-emitting diode 205.

The glowing of the light-emitting diode 201 represents an over-exposure alarm in case of an exposure time shorter than 1/2,000 second, the glowing of the light-emitting diode 209 represents an under-exposure alarm in case of an exposure time shorter than 1/15 second, and the glowing of the light-emitting diode 210 represents indicates over-flow in case of an exposure time longer than the maximum exposure time, i.e., the upper limit of the range controllable with the instant control system.

While the light-emitting diode 19-3 in the example of the self-timer operation indicator shown in FIG. 2 is adapted to forecast the end of the self-timer operation by being turned on for only one second before the end of the self-timer period, FIGS. 6 and 7 show other methods of indication of the self-timer operation.

FIG. 5 shows the method adopted in the self-timer operation indicator 19 in the embodiment of FIG. 2 for the purpose of clarifying the difference with respect to the examples shown in FIGS. 6 and 7.

Figures 5A, 5B:
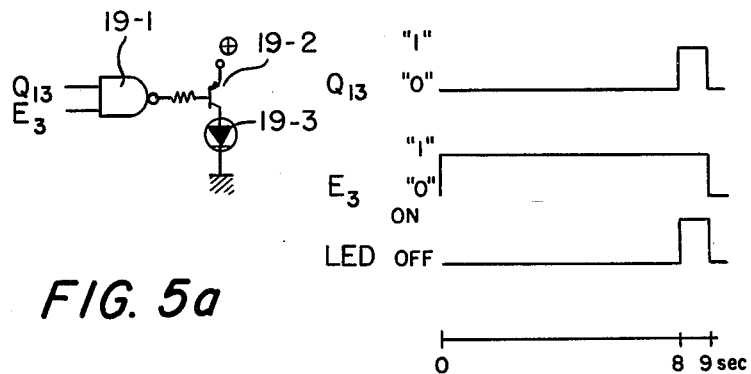
FIG. 5 illustrates one embodiment of the self-timer operation indicator circuit.

In the case of FIGS. 5a and 5b, the light-emitting diode 19-3 is turned on with the signals $Q_{13}$ and $E_3$ to emit light for only one second before the end of the self-timer operation, as already mentioned in connection with the embodiment of FIG. 2.

Figures 6A, 6B:
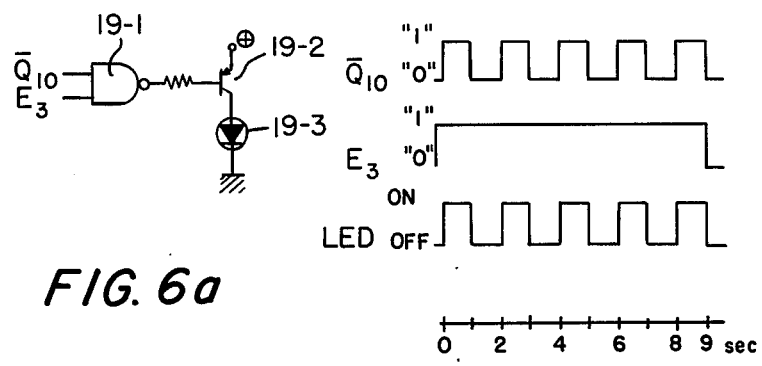
FIGS. 6 and 7 show other embodiments of the self-timer operation indicator circuit.

In the case of FIGS. 6a and 6b, the NAND circuit 19-1 receives output $\overline{Q_{10}}$ instead of the output $Q_{13}$ as shown in FIG. 6a. Thus, the light-emitting diode 19-3 is on-off operated during the operation of the self-timer as shown by the chart of FIG. 6b.

Figures 7A, 7B:
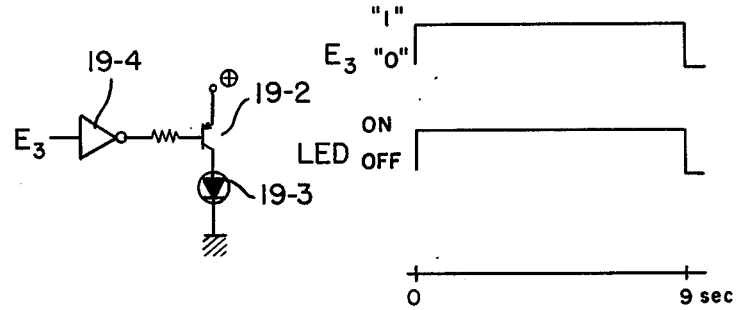

In the case of FIGS. 7a and 7b, the inverter 19-4 in place of the NAND circuit 19-1 is connected to the base of the transistor 19-2, and the output $E_4$ is coupled to the inverter 19-4, as shown in FIG. 6a. In this case, the light-emitting diode 19-3 continuously emits light only during the operation of the self-timer as shown by the chart of FIG. 7b.

While in the above examples of FIGS. 5 to 7 the self-timer period is assumed to be nine seconds, this period is of course not limitative.

Figure 8:
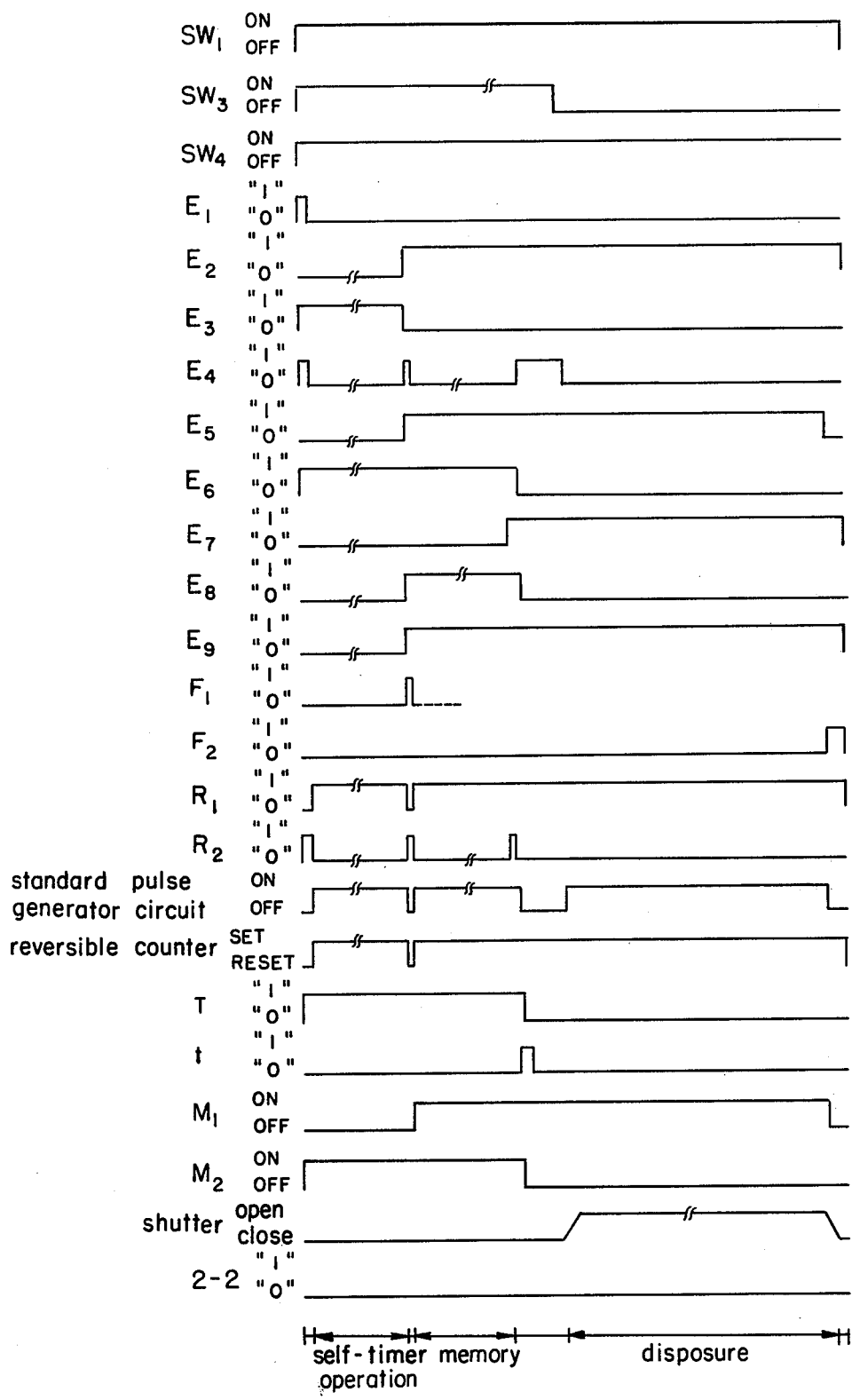
FIGS. 8 to 11 are time charts showing the signal level at various switches and circuits and the state of the shutter.
Figure 9:
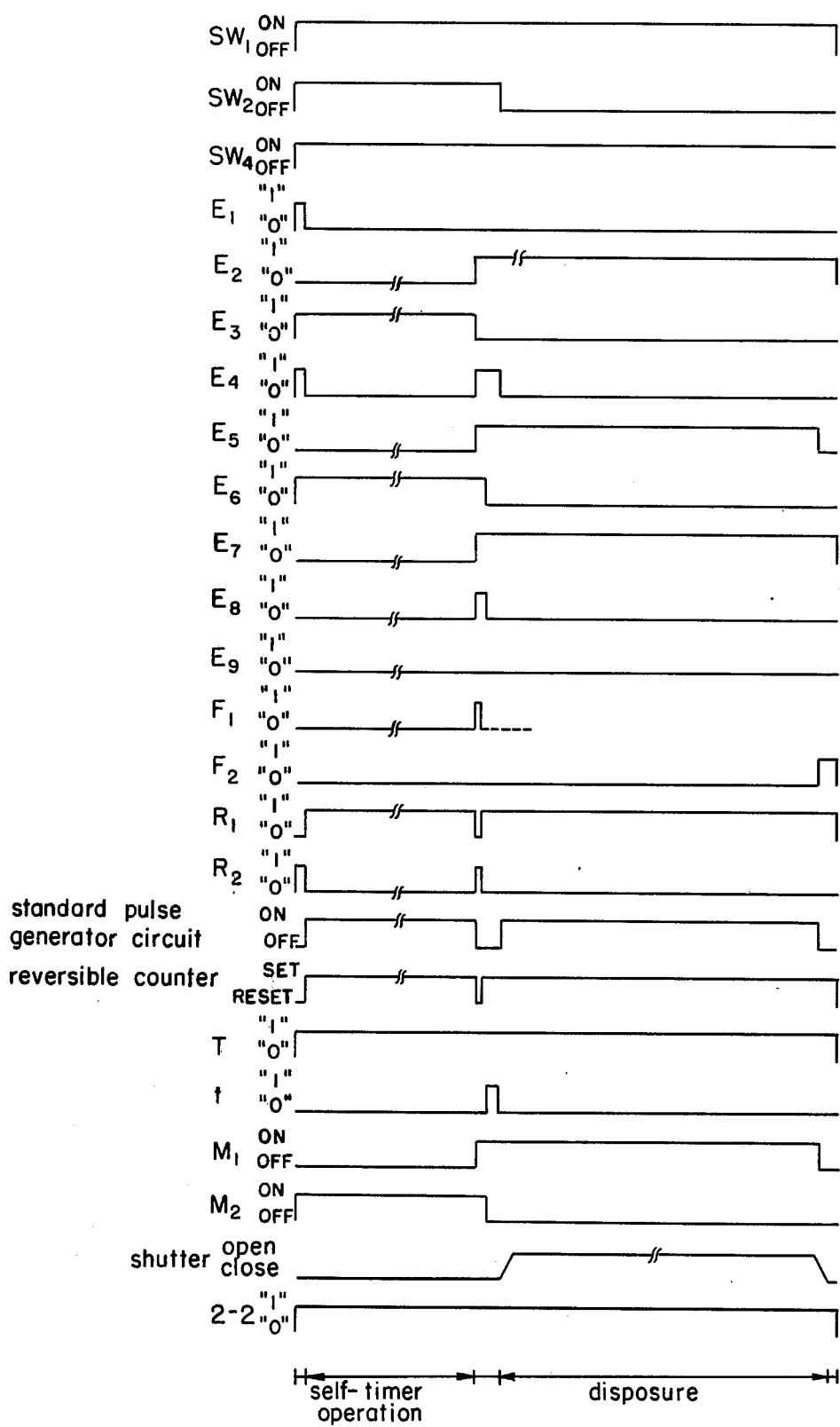
Figure 10:
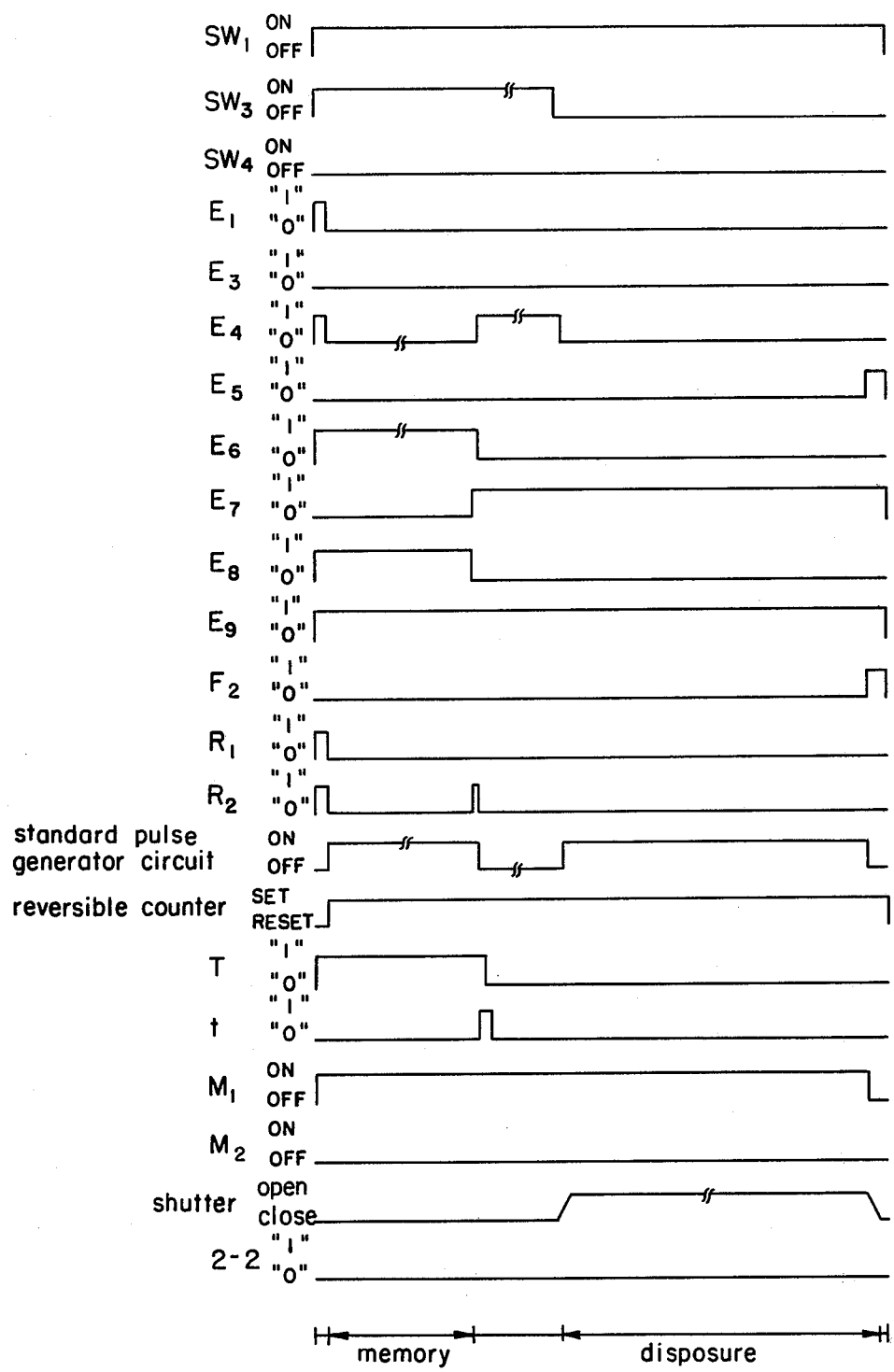
Figure 11:
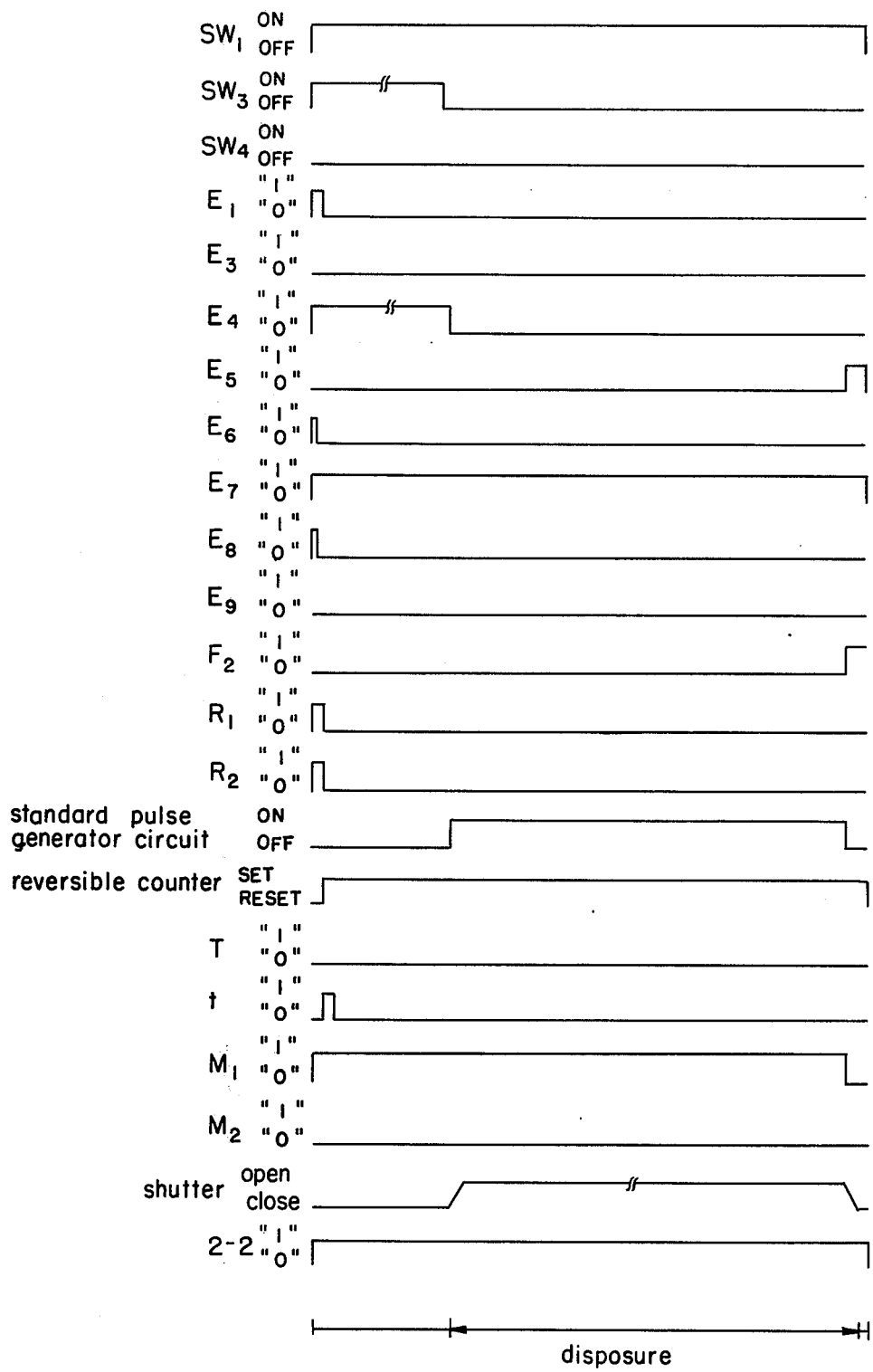

The time charts of FIGS. 8 to 11 show signal levels of signals at respective switches and control terminals and also the state of the shutter, with FIG. 8 for the case of the automatic control with the use of the self-timer, FIG. 9 for the case of the manual control with the use of the self-timer, FIG. 10 for the case of the automatic control without the use of the self-timer and FIG. 11 for the case of the manual control without the use of the self-timer. In these Figures, the symbols $E_1$, $E_2$, ..., $E_9$, $F_1$, $F_2$, $R_1$, $R_2$, ..., represent signals of like reference symbols in FIG. 2.

As has been described in the foregoing, according to the invention the self-timer operation indicator circuit indicates the operation of an electric shutter camera self-timer using a digital recording and reproducing system having a self-timer function for counting and memorizing a number of pulses produced from a pulse generator in a counter circuit, said number of pulses corresponding to the brightness of a subject, and for controlling the exposure time in response to the triggering of a camera shutter according to the memorized content of the counter circuit, and controlling, in the case of the use of the self-timer, the operative period of the self-timer by frequency dividing the pulse output of the pulse generator through said counter circuit. The self-timer operation indicator circuit is controlled at the time of the use of the self-timer by the frequency divided pulse output of said counter circuit, so that it has the following excellent advantages.

A. Perfect indication of the self-timer operation can be obtained since the self-timer control electromagnet and self-timer operation indicator circuit are controlled independently of each other.

B. Since the self-timer operation indicator circuit is controlled by the frequency divided pulse signal obtained through the counter circuit, various indications such as forecast of the end of the self-timer operation and indication of the self-timer operation are possible.

C. The control of the self-timer operation indicator circuit is effected totally electrically, without use of any mechanical switch, so that high reliability can be ensured.

Besides the above advantages, there are a number of advantages of the invention, so that the invention is very useful.

What we claim is:

1. A system for indicating the operation of a self-timer in an electric camera shutter of the type having a digital recording and reproducing system operable in a self-timer mode for counting and memorizing in a counter circuit a number of pulses produced from a pulse generator circuit, said number of pulses corresponding to the brightness of a subject to be photographed: means for controlling the exposure time in response to the triggering of a camera shutter release member according to the memorized content of said counter circuit and for controlling, in the case of using a self-timer, the operative period of the self-timer by frequency dividing the pulse output of said pulse generator through said counter circuit; and a self-timer operation indicator circuit controlled at the time of using the self-timer by the frequency division pulse output of said counter circuit for indicating operation in the self-timer mode.

2. In an electric camera shutter of the self-timer type having a self-timer mode of operation and including a pulse generator circuit for generating pulses at a standard rate; and means including a reversible counter for counting and memorizing pulses from said pulse generator circuit corresponding in number to the brightness of a subject to be photographed: means for selectively controlling the exposure time in accordance with the memorized content of said reversible counter; means for selectively controlling the exposure time in accordance with a predetermined self-timer period; and means responsive to the output of said reversible counter for indicating when said electric camera shutter is in the self-timer mode of operation.

3. An electric camera shutter according to claim 2; further including means separate from said means for indicating the self-timer mode of operation for indicating the camera shutter speed.

* * * * *